United States Patent
Kawaguchi et al.

(10) Patent No.: US 9,359,927 B2
(45) Date of Patent: Jun. 7, 2016

(54) EXHAUST GAS PURIFICATION SYSTEM FOR AN INTERNAL COMBUSTION ENGINE

(71) Applicant: TOYOTA JIDOSHA KABUSHIKI KAISHA, Toyota-shi, Aichi (JP)

(72) Inventors: Bungo Kawaguchi, Susono (JP); Tomihisa Oda, Numazu (JP); Tomomi Onishi, Susono (JP); Masaaki Sato, Susono (JP); Satoshi Kobayakawa, Susono (JP); Takeru Shirasawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/568,585

(22) Filed: Dec. 12, 2014

(65) Prior Publication Data

US 2015/0113985 A1 Apr. 30, 2015

Related U.S. Application Data

(62) Division of application No. 13/514,752, filed as application No. PCT/JP2009/070528 on Dec. 8, 2009, now Pat. No. 8,943,802.

(51) Int. Cl.
*F01N 3/00* (2006.01)
*F01N 3/20* (2006.01)
(Continued)

(52) U.S. Cl.
CPC *F01N 3/208* (2013.01); *F01N 3/20* (2013.01); *F01N 3/2013* (2013.01); *F01N 13/009* (2014.06); *F02D 41/005* (2013.01);
(Continued)

(58) Field of Classification Search
USPC .................................. 60/272–324
See application file for complete search history.

(56) References Cited

U.S. PATENT DOCUMENTS

| 6,021,640 | A | 2/2000 | Hirota et al. |
| 6,029,443 | A | 2/2000 | Hirota et al. |

(Continued)

FOREIGN PATENT DOCUMENTS

| JP | 09324706 A | 12/1997 |
| JP | 10037742 A | 2/1998 |

(Continued)

OTHER PUBLICATIONS

International Search Report issued in International Application No. PCT/JP2009/070528 dated Mar. 2, 2010.

(Continued)

*Primary Examiner* — Jesse Bogue
(74) *Attorney, Agent, or Firm* — Oliff PLC

(57) ABSTRACT

The present invention discloses an exhaust gas purification system for an internal combustion engine, which is provided with: a low pressure EGR mechanism that is equipped with a low pressure EGR passage and a low pressure EGR valve; a selective reduction type catalyst that is arranged in a portion of the exhaust passage downstream; a supply device which serves to supply an ammonia derived compound to said selective reduction type catalyst; and a control unit that causes said supply device to supply the ammonia derived compound when said low pressure EGR valve is in a valve open state, makes the amount of the ammonia derived compound supplied from said supply device larger in cases where an amount of the low pressure EGR gas flowing through said low pressure EGR passage is large, in comparison with the case where it is small.

13 Claims, 17 Drawing Sheets

(51) Int. Cl.
  *F02D 41/00* (2006.01)
  *F02M 25/07* (2006.01)
  *F01N 13/00* (2010.01)
  *F02B 29/04* (2006.01)
  *F02B 37/22* (2006.01)
  *F02D 41/12* (2006.01)

(52) U.S. Cl.
  CPC ....... *F02M25/0707* (2013.01); *F02M 25/0709* (2013.01); *F02M 25/0718* (2013.01); *F02M 25/0742* (2013.01); *F01N 2240/36* (2013.01); *F01N 2240/40* (2013.01); *F01N 2610/02* (2013.01); *F01N 2610/1453* (2013.01); *F02B 29/0406* (2013.01); *F02B 37/22* (2013.01); *F02D 41/0065* (2013.01); *F02D 41/126* (2013.01); *F02M 25/0713* (2013.01); *F02M 25/0727* (2013.01); *Y02T 10/24* (2013.01); *Y02T 10/26* (2013.01); *Y02T 10/47* (2013.01)

(56) References Cited

U.S. PATENT DOCUMENTS

| | | | |
|---|---|---|---|
| 8,151,558 | B2 | 4/2012 | Robel et al. |
| 8,272,371 | B2 | 9/2012 | Fasold et al. |
| 8,943,802 | B2 | 2/2015 | Kawaguchi et al. |
| 2006/0086080 | A1 | 4/2006 | Katogi et al. |
| 2008/0060348 | A1 | 3/2008 | Robel et al. |
| 2008/0155972 | A1 | 7/2008 | Driscoll et al. |
| 2008/0158972 | A1 | 7/2008 | Pan et al. |
| 2008/0202101 | A1 | 8/2008 | Driscoll et al. |
| 2009/0038308 | A1 | 2/2009 | Nagae |
| 2009/0193794 | A1 | 8/2009 | Robel et al. |
| 2010/0083636 | A1 | 4/2010 | Wang et al. |
| 2010/0242928 | A1 | 9/2010 | Fasold et al. |
| 2011/0259290 | A1* | 10/2011 | Michikawauchi ..... F02M 25/14 123/1 A |
| 2012/0159934 | A1 | 6/2012 | Itoh |
| 2014/0090362 | A1* | 4/2014 | Eckhoff ................ F01N 3/0821 60/274 |
| 2014/0123630 | A1* | 5/2014 | Eckhoff ................ F01N 3/035 60/274 |
| 2014/0130483 | A1* | 5/2014 | Miyake ............... F02D 41/0055 60/285 |

FOREIGN PATENT DOCUMENTS

| | | |
|---|---|---|
| JP | 11082182 A | 3/1999 |
| JP | 2003232218 A | 8/2003 |
| JP | 2005127258 A | 5/2005 |
| JP | 2007182805 A | 7/2007 |
| JP | 2007291974 A | 11/2007 |
| JP | 2007315372 A | 12/2007 |
| JP | 2008128115 A | 6/2008 |
| JP | 2008144633 A | 6/2008 |
| JP | 2008261300 A | 10/2008 |
| JP | 2009085011 A | 4/2009 |
| JP | 2009092005 A | 4/2009 |
| JP | 2010043585 A | 2/2010 |
| WO | 2007/136148 A1 | 11/2007 |
| WO | 2008/030314 A1 | 3/2008 |

OTHER PUBLICATIONS

Sep. 16, 2014 Notice of Allowance and Fees Due issued in U.S. Appl. No. 13/514,752.
May 2, 2014 Non-Final Rejection issued in U.S. Appl. No. 13/514,752.
October 6, 2014 Restriction/Election Requirement issued in U.S. Appl. No. 14/004,065.
Dec. 26, 2014 Non-Final Rejection issued in U.S. Appl. No. 14/004,065.
Jul. 6, 2015 Final Rejection issued in U.S. Appl. No. 14/004,065.
Dec. 9, 2015 Non-Final Rejection issued in U.S. Appl. No. 14/004,065.

* cited by examiner

EXHAUST GAS PURIFICATION SYSTEM FOR AN INTERNAL COMBUSTION ENGINE

This is a Divisional Application of U.S. application Ser. No. 13/514,752, filed Jun. 8, 2012, which in turn is a National Stage Entry of International Application No.: PCT/JP2009/070528, filed Dec. 8, 2009. The disclosures of the prior applications are hereby incorporated by reference herein in their entireties.

BACKGROUND

1. Technical Field

The present invention relates to an exhaust gas purification system for an internal combustion engine, and in particular to a technique which serves to suppress the component parts of an intake system from being corroded by an EGR (Exhaust Gas Recirculation) gas.

2. Background Art

In recent years, there has been known a low pressure EGR device (LPL-EGR system) which serves to introduce a part of an exhaust gas flowing downstream of a turbine of a centrifugal supercharger into intake air upstream of a compressor thereof. In an internal combustion engine provided with an LPL-EGR system, when condensed water existing in a path of an EGR gas comes in contact with the EGR gas, the hydrogen ion exponent or power of hydrogen ions (pH) of the condensed water may be dropped (or strongly acidized or oxidized).

As a result, there is a possibility that the above-mentioned condensed water and/or substances evaporated from the condensed water may cause chemical changes on component parts such as a compressor, an intercooler, and so on. On the other hand, there has also been proposed a technique in which an addition valve for adding a neutralizing agent is arranged in an intake passage at a location upstream of a compressor (for example, see a first patent document).

PRIOR ART DOCUMENTS

Patent Documents

Patent Document 1: Japanese Patent Application Laid-Open No. 2008-144633
Patent Document 2: Japanese Patent Application Laid-Open No. 09-324706
Patent Document 3: Japanese Patent Application Laid-Open No. 2009-92005
Patent Document 4: Japanese Patent Application Laid-Open No. 2009-85011
Patent Document 5: Japanese Patent Application Laid-Open No. 11-82182

DISCLOSURE OF THE INVENTION

Problem to be Solved by the Invention

According to the above-mentioned conventional technique, however, it is necessary to newly add the neutralizing agent addition valve, thus giving rise to a possibility that an increase in the number of component parts and a reduction in vehicle mountability may be caused.

The present invention has been made in view of the above-mentioned actual circumstances, and has for its object to provide a technique which is capable of suppressing chemical changes in component parts arranged in a path of an EGR gas, while suppressing an increase in the number of parts in an exhaust gas purification system for an internal combustion engine provided with a low pressure EGR device.

Means for Solving the Problem

In order to solve the above-mentioned problems, the present invention resides in an exhaust gas purification system for an internal combustion engine which is provided with a low pressure EGR mechanism for introducing a part of an exhaust gas (a low pressure EGR gas) from an exhaust passage downstream of a turbine of a centrifugal supercharger to an intake passage upstream of a compressor thereof, wherein an ammonia derived compound is supplied to a low pressure EGR gas passage by making use of a supply device which serves to supply the ammonia derived compound to a selective reduction type catalyst.

Specifically, an exhaust gas purification system for an internal combustion engine of the present invention comprises:

a selective reduction type catalyst that is arranged in an exhaust passage of the internal combustion engine;

a low pressure EGR mechanism that is equipped with a low pressure EGR passage which serves to introduce a part of an exhaust gas flowing through a portion of the exhaust passage downstream of a turbine of a centrifugal supercharger to a portion of an intake passage upstream of a compressor as a low pressure EGR gas, and a low pressure EGR valve which serves to change a channel cross section of said low pressure EGR passage;

a supply device that serves to supply an ammonia derived compound to said selective reduction type catalyst, and is arranged in such a manner that the ammonia derived compound is able to be supplied into the exhaust passage at a location upstream of a connection portion of said low pressure EGR passage; and control means for causing said supply device to supply the ammonia derived compound therefrom when said low pressure EGR valve is in a valve open state.

According to such an invention, a part of the ammonia derived compound supplied from the supply device will be supplied to the intake passage by way of the low pressure EGR passage. For that reason, acidic substances (e.g., condensed water, substances evaporated from condensed water, etc.) which exist in a path of the low pressure EGR gas (e.g., the low pressure EGR passage, the intake passage, the compressor, an intercooler, etc.) are neutralized by the ammonia derived compound.

Further, as the supply device, there is used an existing device which is provided in order to supply the ammonia derived compound as a reducing agent to the selective reduction type catalyst, and hence, it becomes possible to suppress chemical changes in the component parts existing in the path of the low pressure EGR gas, while suppressing an increase in the number of component parts.

The exhaust gas purification system for an internal combustion engine of the present invention may be further provided with obtaining means for obtaining a value which is correlated with an amount of acidic substances existing in the path of the low pressure EGR gas. In that case, the control means may make an amount of ammonia derived compound to be supplied larger in cases where the amount or value obtained by the obtaining means is large, in comparison with the case where it is small.

When the amount of supply of the ammonia derived compound is adjusted in the manner as stated above, it becomes possible to neutralize the acidic substances existing in the path of the low pressure EGR gas in a more reliable manner.

Here, note that the control means may perform control in such a manner that the lower the hydrogen ion exponent (pH) of the acidic substances existing in the path of the low pressure EGR gas, the more the amount of supply of the ammonia derived compound becomes.

The exhaust gas purification system for an internal combustion engine according to the present invention may be further provided with detection means for detecting the temperature of the low pressure EGR gas. In that case, the control means may make the amount of supply of the ammonia derived compound larger when the temperature detected by the detection means is higher than a predetermined reference temperature, than when it is lower than the predetermined reference temperature. The reference temperature referred to herein is, for example, a lower limit value of a temperature range in which the ammonia derived compound can be hydrolyzed.

When the ammonia derived compound is hydrolyzed, there are produced compounds with high acid neutralization ability, such as ammonia ($NH_3$). For that reason, if the amount of supply of the ammonia derived compound is adjusted according to the temperature of the low pressure EGR gas, a large amount of ammonia derived compound will not be supplied when the acid neutralization ability is low. As a result, the situation where the amount of consumption of the ammonia derived compound increases unnecessarily is avoided.

Here, note that the control means may stop the operation of the supply device the amount of supply of the ammonia derived compound (i.e., may stop the supply of the ammonia derived compound) in cases where the temperature detected by the detection means is lower than said predetermined reference temperature. In that case, the amount of consumption of the ammonia derived compound can be suppressed to a minimum.

The exhaust gas purification system for an internal combustion engine according to the present invention may be further provided with heating means for heating the low pressure EGR gas. In that case, the control means may operate the heating means when the ammonia derived compound is caused to be supplied from the supply device. If the heating means is caused to operate in this manner, it will be possible to hydrolyze the ammonia derived compound even in cases where the temperature of the exhaust gas is low. As a result, an opportunity to neutralize the acidic substances existing in the path of the low pressure EGR gas will increase.

Here, note that in cases where the selective reduction type catalyst is arranged in a portion of the exhaust passage at the upstream side of the connection portion of the low pressure EGR passage, the heating means may heat the selective reduction type catalyst, or may heat the exhaust gas before flowing into the selective reduction type catalyst.

According to such a heat method, it becomes possible to heat the selective reduction type catalyst, too, in addition to the ammonia derived compound supplied from the supply device. The selective reduction type catalyst has the property of becoming difficult to adsorb the ammonia derived compound, when subjected to high temperatures.

Accordingly, if the selective reduction type catalyst is heated at the time when the supply device supplies the ammonia derived compound, almost all of the ammonia derived compound supplied from the supply device will come to pass through the selective reduction type catalyst. As a result, it becomes easy to adjust the amount of the ammonia derived compound flowing into the low pressure EGR gas passage.

However, a case can also be assumed where the selective reduction type catalyst has adsorbed the ammonia derived compound at the time when the ammonia derived compound is supplied to the path of the low pressure EGR gas. In such a case, if the heating means heats the selective reduction type catalyst in a direct or indirect manner, the ammonia derived compound released from the selective reduction type catalyst, in addition to the ammonia derived compound supplied from the supply device, will also be introduced to the path of the low pressure EGR gas. As a result, in cases where the selective reduction type catalyst is heated, the amount of the ammonia derived compound introduced to the path of the low pressure EGR gas increases more than in cases where the selective reduction type catalyst is not heated.

Accordingly, it is preferable that the amount of the ammonia derived compound to be supplied from the supply device be made an amount which is deducted by an amount of the ammonia derived compound which has been adsorbed by the selective reduction type catalyst. In that case, it is possible to avoid the situation where the ammonia derived compound introduced into the path of the low pressure EGR gas becomes excessive, and at the same time to suppress the amount of the ammonia derived compound to be supplied from the supply device to a minimum level as required. Here, note that the amount of the ammonia derived compound which has been adsorbed by the selective reduction type catalyst can be calculated by using, as parameters, the amount of supply of the ammonia derived compound, the bed temperature of the selective reduction type catalyst, etc.

Here, as the heating means, there can be used a heater that serves to convert electrical energy into thermal or heat energy. However, in a system which is not provided with the heater, it is also possible to heat the ammonia derived compound by means of the following methods, i.e., a method of decreasing the degree of opening of an intake throttle valve, a method of decreasing the degree of opening of an exhaust throttle valve, a method of expanding the capacity of a variable capacity type turbo charger (i.e., increasing the degree of opening of a nozzle vane), a method of increasing the amount of EGR gas, a method of retarding the ignition timing of fuel in the internal combustion engine, and so on.

In addition, in the construction in which the selective reduction type catalyst is arranged in a portion of the exhaust passage at the upstream side of the connection portion of the low pressure EGR passage, the ammonia derived compound supplied from the supply device will be hydrolyzed by the selective reduction type catalyst. For this reason, in the construction in which the selective reduction type catalyst is arranged at the upstream side of the connection portion of the low pressure EGR passage, there is no need to provide heating means as referred to above.

However, in a construction in which no heating means is provided, there will be a possibility that the ammonia derived compound supplied from the supply device may be adsorbed to the selective reduction type catalyst. For that reason, in case where the ammonia derived compound is supplied to the path of the low pressure EGR gas, it is necessary to supply an amount of ammonia derived compound more than the amount of the ammonia derived compound which can be adsorbed by the selective reduction type catalyst.

Therefore, when it is necessary to supply the ammonia derived compound to the path of the low pressure EGR gas, the control means may cause the supply device to supply an amount of the ammonia derived compound more than that which is able to be adsorbed by the selective reduction type catalyst.

In the exhaust gas purification system for an internal combustion engine according to the present invention, the selective reduction type catalyst may be arranged in a portion of the exhaust passage at the downstream side of the connection portion of the low pressure EGR passage. In that case, because the selective reduction type catalyst becomes resistant to the flow of the exhaust gas, the pressure of the exhaust gas at the upstream side of the selective reduction type catalyst becomes high. For this reason, the ammonia derived compound can be supplied to the low pressure EGR passage, without throttling the degree of opening of the exhaust throttle valve to a substantial extent. As a result, it is possible to neutralize the acidic substances in the path of the low pressure EGR gas, without increasing the back pressure acting on the internal combustion engine to a large extent.

Here, note that in the construction in which the selective reduction type catalyst is arranged in a portion of the exhaust passage at the downstream side of the connection portion of the low pressure EGR passage, in cases where a catalyst (e.g., an oxidation catalyst, etc.) is arranged at the upstream side of the connection portion of the low pressure EGR passage, too, it is desirable that a pressure loss of that catalyst be made smaller than a pressure loss of the selective reduction type catalyst.

In addition, in the construction in which the selective reduction type catalyst is arranged in a portion of the exhaust passage at the downstream side of the connection portion of the low pressure EGR passage, in cases where a dispersion plate for dispersing the ammonia derived compound supplied from the supply device is arranged in the exhaust passage, the dispersion plate may be arranged in the portion of the exhaust passage at the downstream side of the connection portion of the low pressure EGR passage.

In that case, the exhaust gas pressure in the connection portion of the low pressure EGR passage is increased due to the pressure loss of the selective reduction type catalyst and the pressure loss of the dispersion plate. As a result, the ammonia derived compound supplied from the supply device will become further easy to flow into the low pressure EGR passage.

Here, note that in the construction in which the selective reduction type catalyst is arranged in the portion of the exhaust passage at the downstream side of the connection portion of the low pressure EGR passage, the control means may make the amount of the ammonia derived compound supplied from the supply device larger in cases where an amount of the low pressure EGR gas flowing through the low pressure EGR passage is large, in comparison with the case where it is small.

The amount of the ammonia derived compound flowing into the low pressure EGR passage becomes more when the amount of the low pressure EGR gas is large, than when it is small, and at the same time, the amount of the ammonia derived compound flowing into the selective reduction type catalyst becomes less when the amount of the low pressure EGR gas is large, than when it is small. For that reason, the ammonia derived compound supplied to the selective reduction type catalyst may become short or insufficient.

In contrast to this, if ammonia ($NH_3$) is supplied from the supply device in a larger amount when the amount of low pressure EGR gas is large, than when it is small, it will be possible to avoid the situation where the ammonia derived compound supplied to the selective reduction type catalyst becomes short or insufficient. As a result, it will become possible to neutralize the acidic substances existing in the path of the low pressure EGR gas, without decreasing the purification ability of the selective reduction type catalyst.

In cases where the internal combustion engine to which the present invention is applied is provided with a low pressure EGR mechanism and a high pressure EGR mechanism, the exhaust gas purification system for an internal combustion engine according to the present invention may be further provided with calculation means for calculating an amount of the ammonia derived compound flowing through the low pressure EGR passage. In that case, the control means may correct a ratio between a flow rate of the low pressure EGR gas and a flow rate of the high pressure EGR gas according to a result of the calculation of the calculation means. Here, note that the high pressure EGR mechanism referred to herein is a mechanism that is provided with a high pressure EGR passage which serves to introduce a part of the exhaust gas flowing through a portion of the exhaust passage at the upstream side of the turbine of the centrifugal supercharger to a portion of the intake passage at the upstream side of the compressor as a high pressure EGR gas, and a high pressure EGR valve which serves to change a channel cross section of said high pressure EGR passage.

According to such a construction, in cases where the result of the calculation of the calculation means is less than a target amount, the control means can cause the amount of low pressure EGR gas to increase, without changing the amount of EGR gas (the total amount of the low pressure EGR gas and the high pressure EGR gas) introduced into the internal combustion engine, by correcting the degree of opening of the low pressure EGR valve to an open side (in an increasing direction) and at the same time correcting the degree of opening of the high pressure EGR valve to a closed side (in a decreasing direction). As a result, it is possible to increase the amount of the ammonia derived compound flowing through the low pressure EGR gas passage to a target value.

On the other hand, in cases where the result of the calculation of the calculation means is more than the target amount, the control means can cause the amount of low pressure EGR gas to decrease, without changing the amount of EGR gas introduced into the internal combustion engine, by correcting the degree of opening of the low pressure EGR valve to a closed side and at the same time correcting the degree of opening of the high pressure EGR valve to an open side. As a result, it is possible to decrease the amount of the ammonia derived compound flowing through the low pressure EGR gas passage to the target value.

The control means of the present invention may carry out supply processing which is processing to cause the low pressure EGR valve to open so that the ammonia derived compound is made to be supplied from the supply device, at the time when deceleration fuel cut-off control of the internal combustion engine is carried out. In that case, it becomes possible to adjust the amount of low pressure EGR gas, without affecting the combustion state of the internal combustion engine. As a result, it also becomes possible to adjust the amount of the ammonia derived compound flowing through the low pressure EGR gas passage, without affecting the combustion state of the internal combustion engine.

Here, note that in cases where the above-mentioned supply processing is carried out, the control means may close an exhaust throttle valve, which is arranged in a portion of the exhaust passage at the downstream side of the connection portion of the low pressure EGR passage and at the downstream side of the selective reduction type catalyst. In that case, all the amount of the ammonia derived compound supplied from the supply device will flow into the low pressure EGR passage. As a result, it is possible to neutralize the acidic substances by means of a minimum amount of the ammonia derived compound. Moreover, it is also possible to suppress the situation where the ammonia derived compound is released into the atmospheric air.

In addition, the control means may make an amount of the low pressure EGR gas to be introduced into the intake passage for a predetermined period of time after termination of the deceleration fuel cut-off control smaller in cases where the above-mentioned supply processing has been carried out, in comparison with the case where the supply processing has not been carried out.

In cases where the above-mentioned supply processing has not been carried out, the inside of the path of the low pressure EGR gas will be filled with air. On the other hand, in cases where the above-mentioned supply processing has been carried out, the inside of the path of the low pressure EGR gas will be filled with the low pressure EGR gas.

Accordingly, in cases where the above-mentioned supply processing has been carried out, if the amount of low pressure EGR gas after the termination of the deceleration fuel cut-off control is made equal to that in cases where the supply processing has not been carried out, there will be a possibility that the amount of oxygen introduced into the internal combustion engine may become too small.

Consequently, in cases where the above-mentioned supply processing has been carried out, if the amount of low pressure EGR gas for the predetermined period of time after the termination of the deceleration fuel cut-off control is made smaller in comparison with the case where the supply processing has not been carried out, it is possible to avoid the situation where the amount of oxygen introduced into the internal combustion engine becomes too small.

Here, note that the above-mentioned predetermined period of time corresponds to a period of time taken until the low pressure EGR gas existing in the intake passage at the downstream side of the connection portion of the low pressure EGR passage has been scavenged with fresh air (air) (in other words, a period of time taken for the concentration of oxygen in the intake passage at the downstream side of the connection portion of the low pressure EGR passage to rise to a concentration which has been beforehand set). The period of time taken until the low pressure EGR gas existing in the intake passage has been scavenged can be calculated by using, as parameters, the volume of a path extending from the connection portion of the low pressure EGR passage to the internal combustion engine, and the number of engine revolutions per unit time (in other words, the amount of gas which is taken in per unit time by the internal combustion engine).

However, it is necessary to cause the amount of low pressure EGR gas to increase up to an ordinary amount (a target amount of low pressure EGR gas in cases where the above-mentioned supply processing has not been carried out) after the elapse of the above-mentioned predetermined period of time, it will take some period of time (a transport delay of the low pressure EGR gas) until the low pressure EGR gas taken into the low pressure EGR passage from the exhaust passage reaches the internal combustion engine. For that reason, there will be a possibility that the amount of the low pressure EGR gas introduced into the internal combustion engine after the elapse of the predetermined period of time may become short or insufficient.

Accordingly, the exhaust gas purification system for an internal combustion engine according to the present invention may be made to correct the degree of opening of the high pressure EGR valve after the lapse of the predetermined period of time to an open side (i.e., to a degree of opening larger than that in cases where the above-mentioned supply processing has not been carried out).

Because the path of the high pressure EGR gas is shorter than the path of the low pressure EGR gas, the high pressure EGR gas taken into the high pressure EGR passage from the exhaust passage reaches the internal combustion engine earlier than the low pressure EGR gas does. As a result, if the degree of opening of the high pressure EGR valve after the elapse of the predetermined period of time is corrected to the open side, it will become possible to compensate for the amount of shortage or insufficiency of the low pressure EGR gas with the high pressure EGR gas.

Effects of the Invention

According to the present invention, in an exhaust gas purification system for an internal combustion engine which is provided with a low pressure EGR device, it is possible to suppress chemical changes in component parts arranged in a path of an EGR gas, while suppressing an increase in the number of component parts.

THE MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
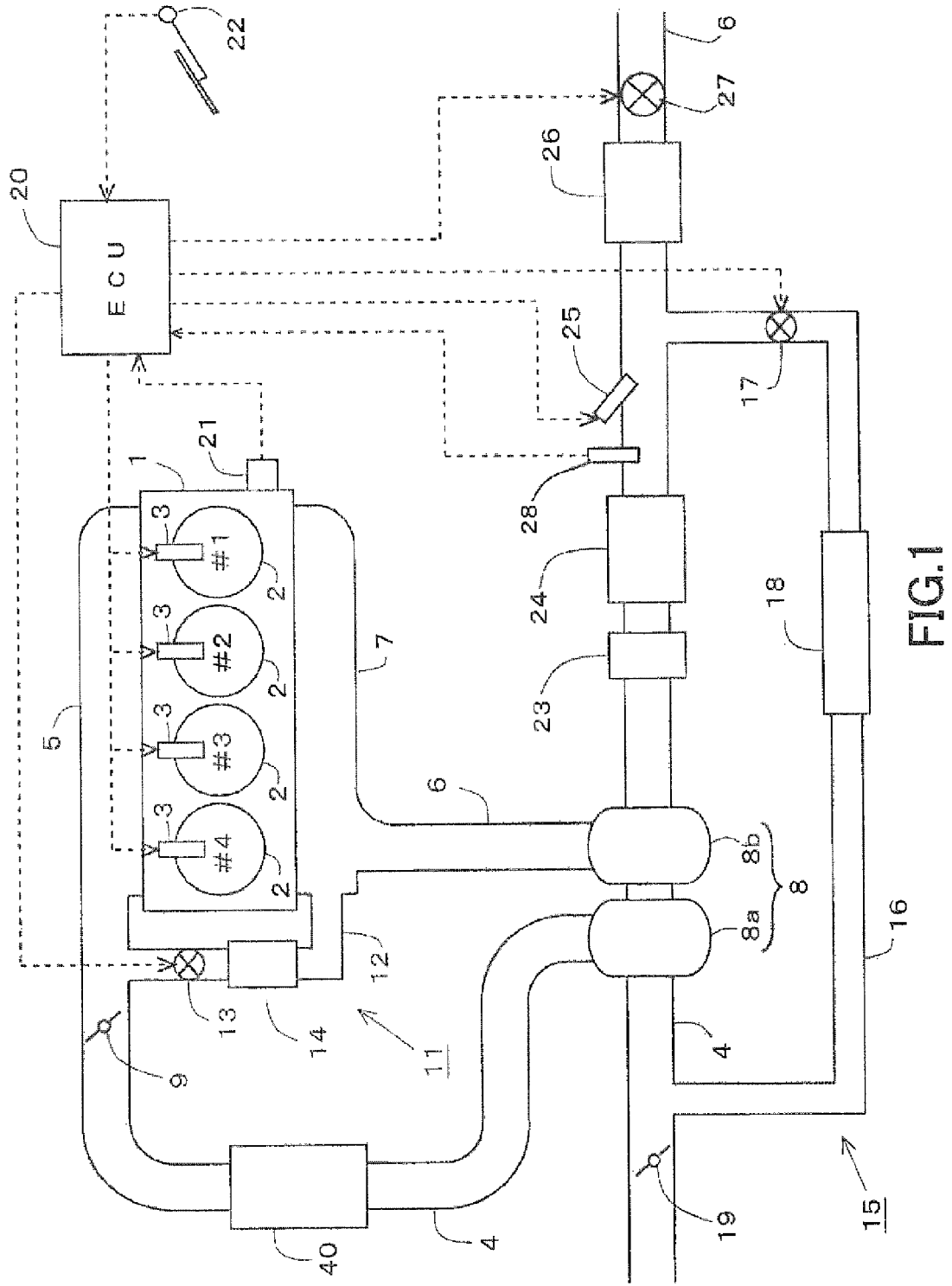
FIG. 1 is a view showing the schematic construction of an exhaust gas purification system for an internal combustion engine in a first embodiment of the present invention.

In the first place, a first embodiment of the present invention will be described with reference to FIGS. 1 and 2. FIG. 1 is a view showing the schematic construction of an exhaust gas purification system for an internal combustion engine in this first embodiment.

An internal combustion engine 1 shown in FIG. 1 is a compression ignition type internal combustion engine (diesel engine) having four cylinders 2 for use in driving a vehicle. On each of the cylinders 2 of the internal combustion engine 1, there is mounted a fuel injection valve 3 for directly injecting fuel into a corresponding cylinder 2.

An intake manifold 5 and an exhaust manifold 7 are connected to the internal combustion engine 1. An intake passage 4 is connected to the intake manifold 5. An exhaust passage 6 is connected to the exhaust manifold 7. A centrifugal supercharger (turbocharger) 8 has a compressor 8a arranged in the intake passage 4. The turbocharger 8 has a turbine 8b arranged in the exhaust passage 6.

A first throttle valve 9 is arranged in the intake passage 4 at the downstream side of the compressor 8a. A second throttle valve 19 is arranged in the intake passage 4 at the upstream side of the compressor 8a. An intercooler 40 is arranged in the intake passage 4 at the downstream side of the compressor 8a and at the upstream side of the first throttle valve 9.

On the exhaust passage 6 at the downstream side of the turbine 8b, there are arranged an oxidation catalyst 23, a particulate filter 24, a selective reduction type catalyst 26, and an exhaust throttle valve 27 in a sequential manner from an upstream side along the direction of flow of the exhaust gas. The selective reduction type catalyst 26 is a catalyst which serves to adsorb polar molecules such as ammonia ($NH_3$), in a selective manner, and reduces and purifies nitrogen oxides (NOx) in the exhaust gas by the use of the ammonia ($NH_3$) thus adsorbed as a reducing agent.

An addition valve 25 for supplying the reducing agent to the above-mentioned selective reduction type catalyst 26 is mounted on the exhaust passage 6 at a location between the particulate filter 24 and the selective reduction type catalyst 26. As the reducing agent supplied from the addition valve 25, there can be exemplified an ammonia derived compound in the form of a liquid, a gas, or a solid. In this embodiment, it is assumed that an urea aqueous solution is used as the reducing agent supplied from the addition valve 25. Here, note that the addition valve 25 is merely one form of the supply device according to the present invention.

The above-mentioned addition valve 25 serves to add the urea aqueous solution into the exhaust passage 6 when the selective reduction type catalyst 26 is in an active state. The urea aqueous solution added into the exhaust passage 6 is thermally decomposed and hydrolyzed in the exhaust gas or in the selective reduction type catalyst 26 to generate ammonia ($NH_3$). The ammonia ($NH_3$) generated in this manner is adsorbed to the selective reduction type catalyst 26, thereby causing the nitrogen oxides (NOx) in the exhaust gas to be reduced. Here, note that the addition of the urea aqueous solution by means of the addition valve 25 is to be carried out in a period or cycle which has been set beforehand.

A high pressure EGR device 11 and a low pressure EGR device 15 are arranged in an intake and exhaust system of the internal combustion engine 1. The high pressure EGR device 11 is provided with a high pressure EGR passage 12, a high pressure EGR valve 13, and a high pressure EGR cooler 14. The high pressure EGR passage 12 is connected at one end thereof to the exhaust manifold 7, and is also connected at the other end thereof to a portion of the intake passage 4 at the downstream side of the first throttle valve 9.

The high pressure EGR valve 13 and the high pressure EGR cooler 14 are arranged in the high pressure EGR passage 12. The flow rate of a high pressure EGR gas, which is introduced into the intake passage 4 from the exhaust manifold 7 by way of the high pressure EGR passage 12, is controlled by means of the high pressure EGR valve 13.

The low pressure EGR device 15 is provided with a low pressure EGR passage 16, a low pressure EGR valve 17, and a low pressure EGR cooler 18. The low pressure EGR passage 16 is connected at one end thereof to a portion of the exhaust passage 6 at the downstream side of the addition valve 25 and at the upstream side of the selective reduction type catalyst 26, and is also connected at the other end thereof to a portion of the intake passage 4 at the downstream side of the second throttle valve 19 and at the upstream side of the compressor 8a.

The low pressure EGR valve 17 and the low pressure EGR cooler 18 are arranged in the low pressure EGR passage 16. The flow rate of a low pressure EGR gas, which is introduced into the intake passage 4 from the exhaust passage 6 by way of the low pressure EGR passage 16, is controlled by means of the low pressure EGR valve 17.

An electronic control unit (ECU) 20 is provided in combination with the internal combustion engine 1 as constructed in the above-mentioned manner. A variety of kinds of sensors, such as a crank position sensor 21, an accelerator position sensor 22, an exhaust gas temperature sensor 28 and so on, are electrically connected to the ECU 20. The crank position sensor 21 is a sensor which serves to detect the rotational position of an output shaft (crankshaft) of the internal combustion engine 1. The accelerator position sensor 22 is a sensor which serves to detect an amount of operation (accelerator opening degree) of an accelerator pedal. The exhaust gas temperature sensor 28 is a sensor which detects the temperature of the exhaust gas flowing through the exhaust passage 6. Here, note that in the example shown in FIG. 1, the exhaust gas temperature sensor 28 is arranged in the exhaust passage 6 at a location between the particulate filter 24 and the addition valve 25, but it may be arranged in the exhaust passage 6 at a location upstream of the oxidation catalyst 23, or on the exhaust passage 6 at a location downstream of the addition valve 25, or on the exhaust passage 6 at a location downstream of the selective reduction type catalyst 26.

In addition, a variety of kinds of equipment, such as the fuel injection valve 3, the first throttle valve 9, the second throttle valve 19, the addition valve 25, the high pressure EGR valve 13, the low pressure EGR valve 17, the exhaust throttle valve 27 and so on, are electrically connected to the ECU 20. The ECU 20 controls the above-mentioned variety of kinds of equipment based on the detection signals of the above-mentioned variety of kinds of sensors.

For example, by causing the addition valve 25 to open in a periodic manner when the internal combustion engine 1 is in an operating state, the ECU 20 carries out processing to supply the urea aqueous solution as the reducing agent to the selective reduction type catalyst 26 (hereinafter referred to as "reducing agent addition processing"). Moreover, by causing the addition valve 25 to open when the low pressure EGR valve 17 is in a valve open state, the ECU 20 carries out processing to neutralize acidic substances which exists in the path of the low pressure EGR gas (hereinafter referred to as "acid neutralization processing").

In the following, a method of carrying out the acid neutralizing processing in this embodiment will be described.

Condensed water may accumulate in the path of the low pressure EGR gas. When the condensed water comes in contact with the low pressure EGR gas, the hydrogen ion exponent (power of hydrogen: pH) of the condensed water may drop (be strongly acidized). When condensed water with a low hydrogen ion exponent (pH) and/or vaporized substances (acidic substances) of condensed water flow into the compressor 8a, the intercooler 40 or the like together with the low pressure EGR gas, a chemical change may be made in the compressor 8a, the intercooler 40 or the like.

On the other hand, when the addition valve 25 is opened during the time the low pressure EGR valve 17 in its valve open state, a part of the urea aqueous solution added into the exhaust gas from the addition valve 25 will flow into the low pressure EGR passage 16. Here, note that the urea aqueous solution, when exposed to the hot exhaust gas, is thermally decomposed and hydrolyzed to generate ammonia ($NH_3$). The ammonia ($NH_3$) functions as a neutralizing agent for the acidic substances. Therefore, as the ammonia ($NH_3$) flows through the path of the low pressure EGR gas (the intake passage 4, the compressor 8a and the intercooler 40), the acidic substances existing in the path of the low pressure EGR gas are neutralized by the ammonia ($NH_3$). As a result, the chemical change of the compressor 8a, the intercooler 40, or the like can be suppressed.

Further, in the exhaust gas purification system for an internal combustion engine of this embodiment, the selective reduction type catalyst 26 is arranged in a portion of the exhaust passage 6 at a location downstream of a connection portion of the low pressure EGR passage 16, and hence, the pressure of the exhaust gas at an upstream end of the low pressure EGR passage 16 (i.e., at a connection position at which the low pressure EGR passage 16 and the exhaust passage 6 are connected with each other) becomes high. As the exhaust gas pressure at the upstream end of the low pressure EGR passage 16 becomes high, it becomes easy for the exhaust gas to flow from the exhaust passage 6 into the low pressure EGR passage 16. Therefore, it becomes unnecessary to throttle or decrease the degree of opening of the exhaust throttle valve 27 to a large extent at the time when the low pressure EGR valve 17 is opened. As a result, it becomes possible to suppress a rise in back pressure to a minimum level at the time of opening the low pressure EGR valve 17.

Next, an execution procedure of the acid neutralization processing in this embodiment will be described refer to FIG. 2. FIG. 2 is a flow chart showing a control routine which the ECU 20 carries out at the time of executing the acid neutralization processing. This control routine has been beforehand stored in a ROM of the ECU 20, etc., and is carried out by the ECU 20 in a periodical manner.

Figure 2:
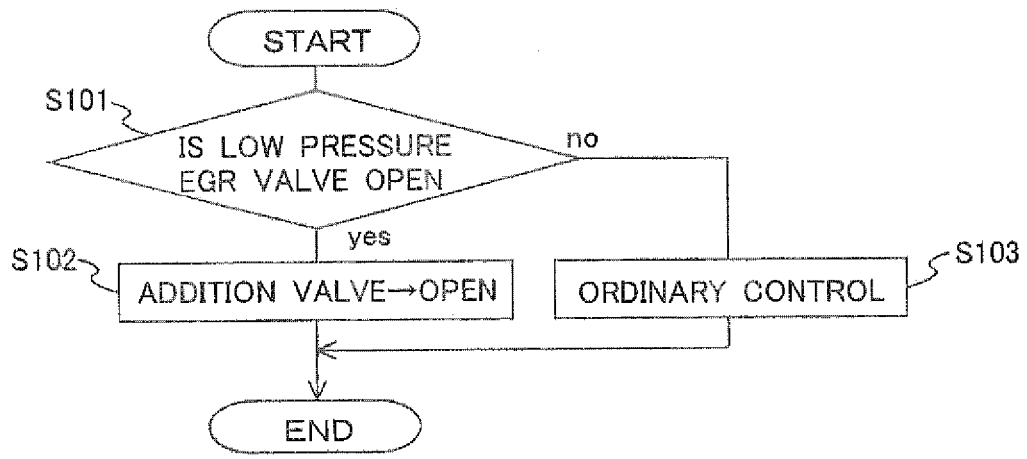
FIG. 2 is a flow chart showing an acid neutralization processing routine in the first embodiment of the present invention.

In the control routine of FIG. 2, the ECU 20 first carries out the processing of step S101. That is, in step S101, the ECU 20 determines whether the low pressure EGR valve 17 is in its valve open state. In cases where a negative determination is made in step S101, the process of the ECU 20 goes to step S103. In step S103, the ECU 20 controls the addition valve 25 in an ordinary manner. That is, the ECU 20 supplies the urea aqueous solution to the selective reduction type catalyst 26 by causing the addition valve 25 to open at a predetermined interval of time which has been set beforehand.

On the other hand, in cases where an affirmative determination is made in the above-mentioned step S101, the process of the ECU 20 goes to step S102. In step S102, the ECU 20 causes the addition valve 25 to open. By carrying out the processing of step S102 in this manner by means of the ECU 20, a control means according to the present invention is achieved.

In cases where the above-mentioned processing of step S102 is carried out, a part of the urea aqueous solution added into the exhaust gas from the addition valve 25 flows into the low pressure EGR passage 16 while being thermally decomposed and hydrolyzed, and the remaining urea aqueous solution is supplied to the selective reduction type catalyst 26 while being thermally decomposed and hydrolyzed.

The ammonia ($NH_3$), which has flowed into the low pressure EGR passage 16, serves to neutralize the acidic substances existing in the path of the low pressure EGR gas. As a result, it becomes possible to avoid a situation in which the compressor 8a and the intercooler 40, which are arranged in the path of the low pressure EGR gas, come into contact with the acidic substances thereby to cause a chemical change.

According to the embodiment as described above, it is possible to suppress chemical changes of the equipment and the component parts which are arranged in the path of the low pressure EGR gas. Moreover, because the addition valve 25 for supplying the reducing agent to the selective reduction type catalyst 26 can be used as the supply device for supplying the neutralizing agent to the path of the low pressure EGR gas, it is not necessary to add any new component parts.

Accordingly, it becomes possible to suppress chemical changes in the component parts which are arranged in the path of the low pressure EGR gas, while suppressing an increase in the number of component parts.

Here, note that in this embodiment, there has been described an example in which the acid neutralization processing is carried out aside from the reducing agent addition processing, the reducing agent addition processing may be used as the acid neutralization processing as well by permitting the execution of the reducing agent addition processing at the time when the low pressure EGR valve 17 is in a valve open state. According to such a method, it becomes unnecessary to carry out the acid neutralization processing separately from the reducing agent addition processing, thus making it possible to attain the simplification of a control logic.

However, when the reducing agent addition processing is carried out during the time the low pressure EGR valve 17 in its valve open state, a part of the reducing agent flows into the low pressure EGR passage 16, so the reducing agent supplied to the selective reduction type catalyst 26 may become short or insufficient. Accordingly, in cases where the reducing agent addition processing is carried out at the time when the low pressure EGR valve 17 is in its valve open state, the amount of addition of the reducing agent may be caused to increase in comparison with the case where the reducing agent addition processing is carried out at the time when the low pressure EGR valve 17 is in its valve closed state.

In addition, in this embodiment, there has been described an example in which the acid neutralization processing is carried out on the condition that the low pressure EGR valve 17 is in its valve open state, but the acid neutralization processing may be carried out on the condition that the temperature of the low pressure EGR gas is not less than a reference temperature, in addition to the condition that the low pressure EGR valve 17 is in its valve open state. The reference temperature referred to herein is a temperature which is equal to a lower limit value of a temperature range in which the urea aqueous solution is thermally decomposed and hydrolyzed, or which is a little higher than the lower limit value of the above-mentioned temperature range.

When the acid neutralization processing is carried out according to such conditions, a substance (ammonia ($NH_3$)) with a high capacity as a neutralizing agent can be supplied to the path of the low pressure EGR gas. As a result, it becomes possible to neutralize the acidic substances existing in the path of the low pressure EGR gas in a more reliable manner. Here, note that as the temperature of the low pressure EGR gas, there can be used the detected signal value of the exhaust gas temperature sensor 28.

Although in this embodiment, reference has been made to an example in which the acid neutralization processing is carried out in a periodic manner, such processing may be carried out by being triggered when the hydrogen ion exponent (pH) of a substance which exists in the path of the low pressure EGR gas has become not more than a predetermined value. The above-mentioned predetermined value is a value which is determined based on a maximum value of the hydrogen ion exponent (pH) considered to cause a chemical change of a component part such as the compressor 8a, the intercooler 40 or the like, and is set to be, for example, a value which is a little larger than the above-mentioned maximum value.

As a method of obtaining the hydrogen ion exponent (pH) of the substance existing in the path of the low pressure EGR gas, there can be exemplified a method of arranging a pH sensor at a location in the path of the low pressure EGR gas at which condensed water is apt to accumulate, a method of obtaining the hydrogen ion exponent (pH) of the substance from a map or a computational model using, as an argument, an operational history of the internal combustion engine 1 (e.g., an integrated value of the number of engine revolutions per unit time, an integrated value of an amount of fuel injection, an integrated value of an amount of low pressure EGR gas, etc.), a method of obtaining the hydrogen ion exponent (pH) of the substance from a map or a computational model using, as arguments, an integrated amount of the nitrogen oxides (NOx) which have flowed into the path of the low pressure EGR gas, and a temperature in the path of the low pressure EGR gas, and so on.

On the other hand, the acid neutralization processing may be carried out by being triggered when the amount of the acidic substances existing in the path of the low pressure EGR gas has exceeded a threshold value which has been set beforehand. As a method of obtaining the amount of the acidic substances existing in the path of the low pressure EGR gas, there can be exemplified a method of obtaining it from a map or a computational model using, as an argument, an operational history of the internal combustion engine 1 (e.g., an integrated value of the number of engine revolutions per unit time, an integrated value of an amount of fuel injection, an integrated value of the low pressure EGR gas, etc.), and a method of obtaining it from a map or a computational model using, as an argument, an integrated amount of the nitrogen oxides (NOx) which has flowed into the low pressure EGR gas passage 16, a temperature in the path of the low pressure EGR gas, or the like.

Second Embodiment

Next, a second embodiment of the present invention will be described with reference to FIG. 3. Here, a construction different from that of the above-mentioned first embodiment will be described, and an explanation of the same construction will be omitted.

The difference of this second embodiment from the above-mentioned first embodiment is that a dispersion plate for dispersing an urea aqueous solution supplied from the addition valve 25 is arranged in a portion of the exhaust passage 6 at the upstream side of the selective reduction type catalyst 26.

Figure 3:
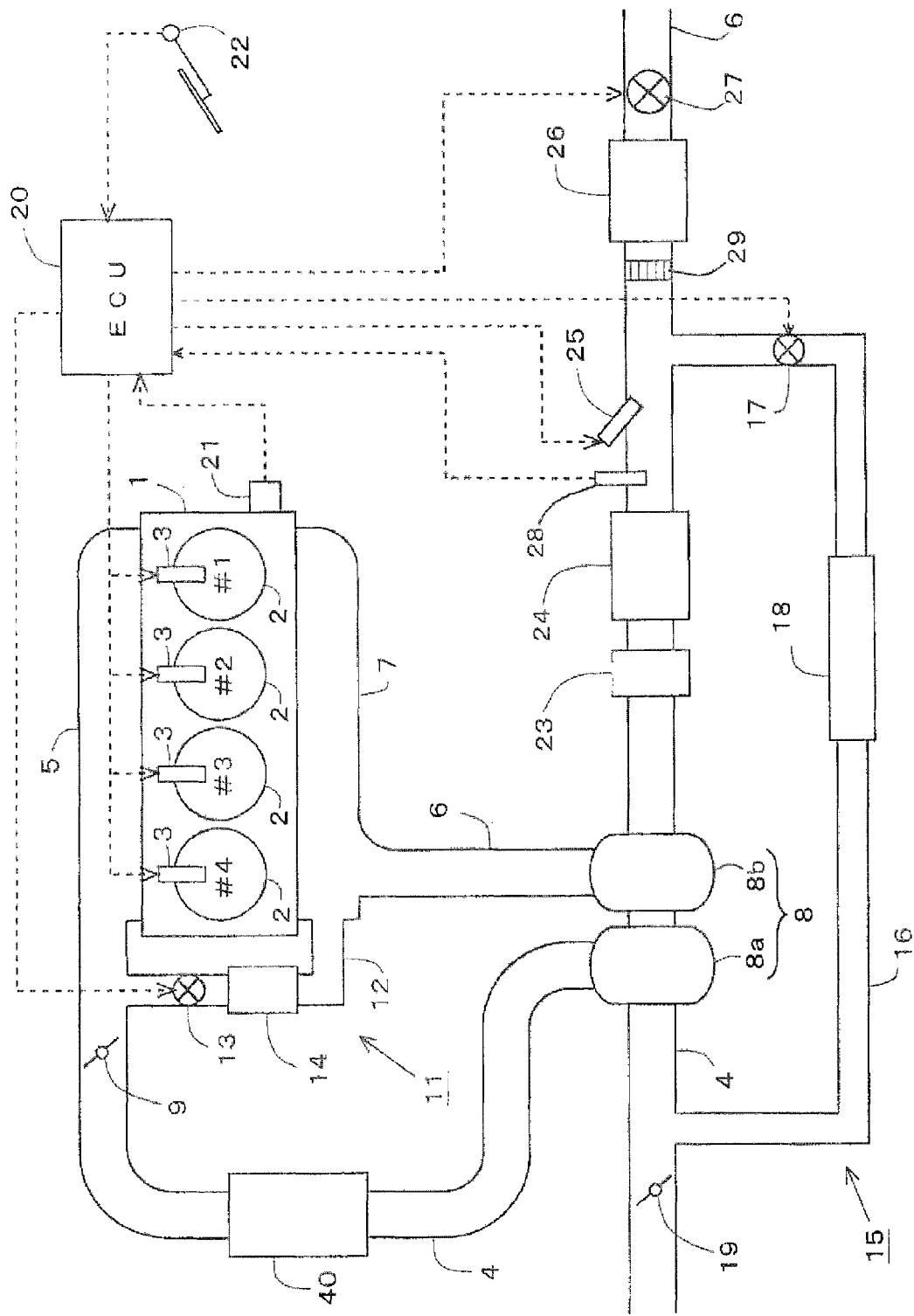
FIG. 3 is a view showing the schematic construction of an exhaust gas purification system for an internal combustion engine in a second embodiment of the present invention.

FIG. 3 is a view showing the schematic construction of an exhaust gas purification system for an internal combustion engine in this second embodiment. As shown in FIG. 3, the dispersion plate 29 is arranged in a portion of the exhaust passage 6 at the upstream side of the selective reduction type catalyst 26 and at the downstream side of the connection portion of the low pressure EGR passage 16. The other construction of this second embodiment is the same as that of the above-mentioned first embodiment.

In cases where the dispersion plate 29 is arranged in that portion of the exhaust passage 6 which is at the upstream side of the selective reduction type catalyst 26 and at the downstream side of the connection portion of the low pressure EGR passage 16, it is possible to make the pressure in the low pressure EGR passage 16 at an upstream end thereof higher in comparison with the case where the dispersion plate 29 is not arranged, or the case where the dispersion plate 29 is arranged in a portion of the exhaust passage 6 at the upstream side of the connection portion of the low pressure EGR passage 16.

Therefore, it becomes easy for the exhaust gas (the low pressure EGR gas) to flow into the low pressure EGR passage 16 from the exhaust passage 6 at the time when the low pressure EGR valve 17 is opened. As a result, it is possible to make larger the degree of opening of the exhaust throttle valve 27 at the time when the low pressure EGR valve 17.

Third Embodiment

Now, a third embodiment of the present invention will be described with reference to FIGS. 4 and 5. Here, a construction different from that of the above-mentioned first embodiment will be described, and an explanation of the same construction will be omitted.

The difference of this third embodiment from the above-mentioned first embodiment is that acid neutralization processing is carried out during the time when deceleration fuel cut-off control of the internal combustion engine 1 is in an execution state.

In the following, an execution procedure of the acid neutralization processing in this embodiment will be described refer to FIG. 4. FIG. 4 is a flow chart showing a control routine which the ECU 20 carries out at the time of executing the acid neutralization processing. This control routine has been beforehand stored in the ROM of the ECU 20, etc., and is carried out by the ECU 20 in a periodical manner.

Figure 4:
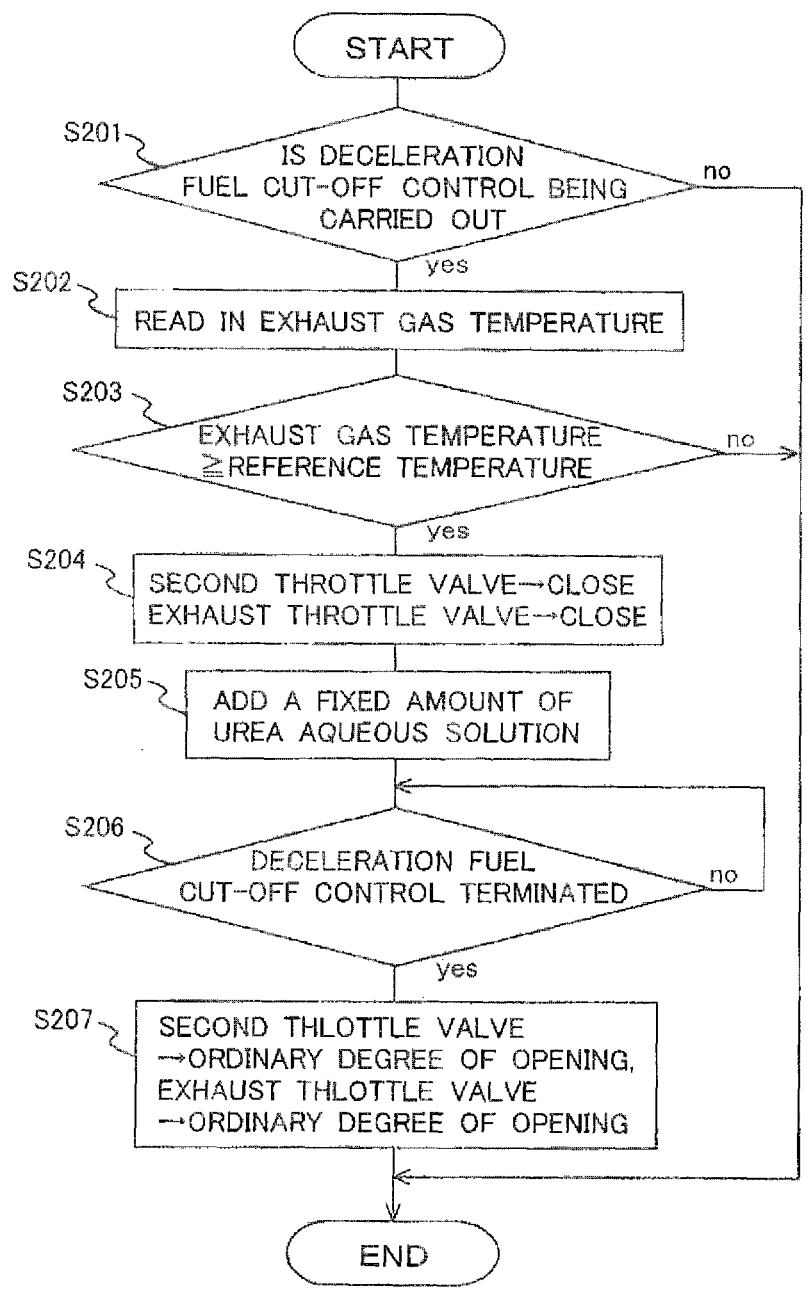
FIG. 4 is a flow chart showing an acid neutralization processing routine in a third embodiment of the present invention.

In the control routine of FIG. 4, the ECU 20 determines in step S201 whether the deceleration fuel cut-off control of the internal combustion engine 1 is being carried out. In cases where a negative determination is made in step S201, the ECU 20 once exits this routine. On the other hand, in cases where an affirmative determination is made in step S201, the process of the ECU 20 goes to step S202.

In step S202, the ECU 20 reads in a detected value of the exhaust gas temperature sensor 28 (a temperature of the exhaust gas). By carrying out the processing of step S202 in this manner by means of the ECU 20, a detection means according to the present invention is achieved.

Subsequently, the process of the ECU 20 goes to step S203, in which it is determined whether the temperature of the exhaust gas thus read in the above-mentioned step S202 is not less than a reference temperature. The reference temperature referred to herein is a temperature which is equal to a lower limit value of a temperature range in which the urea aqueous solution can be thermally decomposed and hydrolyzed, or which is a little higher than the lower limit value of the above-mentioned temperature range.

In cases where a negative determination is made in the above-mentioned step S203 (the exhaust gas temperature<the reference temperature), the ECU 20 once terminates the execution of this routine. On the other hand, in cases where a affirmative determination is made in the above-mentioned step S203 (the exhaust gas temperature the reference temperature), the process of the ECU 20 goes to step S204.

In step S204, the ECU 20 causes the second throttle valve 19 and the exhaust throttle valve 27 to close. Subsequently, the process of the ECU 20 goes to step S205, in which a predetermined amount of urea aqueous solution is added from the addition valve 25. The above-mentioned predetermined amount is a fixed amount which has been beforehand determined, and is a value which has been beforehand set by adaptation or calibration processing making use of experiments, etc.

In step S206, the ECU 20 determines whether a termination condition for the deceleration fuel cut-off control has been satisfied. As the termination condition for the deceleration fuel cut-off control, there can be exemplified a condition in which the number of engine revolutions per unit time is not more than a predetermined lower limit value, or a condition in which a detected signal of the accelerator position sensor 22 (the degree of opening of the accelerator pedal) is larger than zero, or the like.

In cases where a negative determination is made in the above-mentioned step S206, the ECU 20 continues to carry out the processing of step S206 until the termination condition for the deceleration fuel cut-off control is satisfied. On the other hand, in cases where an affirmative determination is made in the above-mentioned step S206, the process of the ECU 20 goes to step S207.

In step S207, the ECU 20 returns the degree of opening of the second throttle valve 19 and the degree of opening of the exhaust throttle valve 27 to their ordinary degrees of opening, respectively.

According to the embodiment as described above, all of the urea aqueous solution supplied from the addition valve 25 will flow into the path of the low pressure EGR gas, so it becomes easy to regulate the amount of the urea aqueous solution to be supplied to the path of the low pressure EGR gas. Moreover, even if acid neutralization processing is carried out when the selective reduction type catalyst 26 is in a state where ammonia ($NH_3$) can not be adsorbed thereto, it is possible to avoid the situation where ammonia ($NH_3$) is released into the atmospheric air.

Here, note that when the deceleration fuel cut-off control of the internal combustion engine 1 is carried out, the temperature of the exhaust gas becomes lower in comparison with the time in which fuel is burned in the internal combustion engine 1. For that reason, there will be a possibility that opportunities for the temperature of the exhaust gas to become not less than the reference temperature, in other words, opportunities to carry out acid neutralization processing, may decrease.

Figure 5:
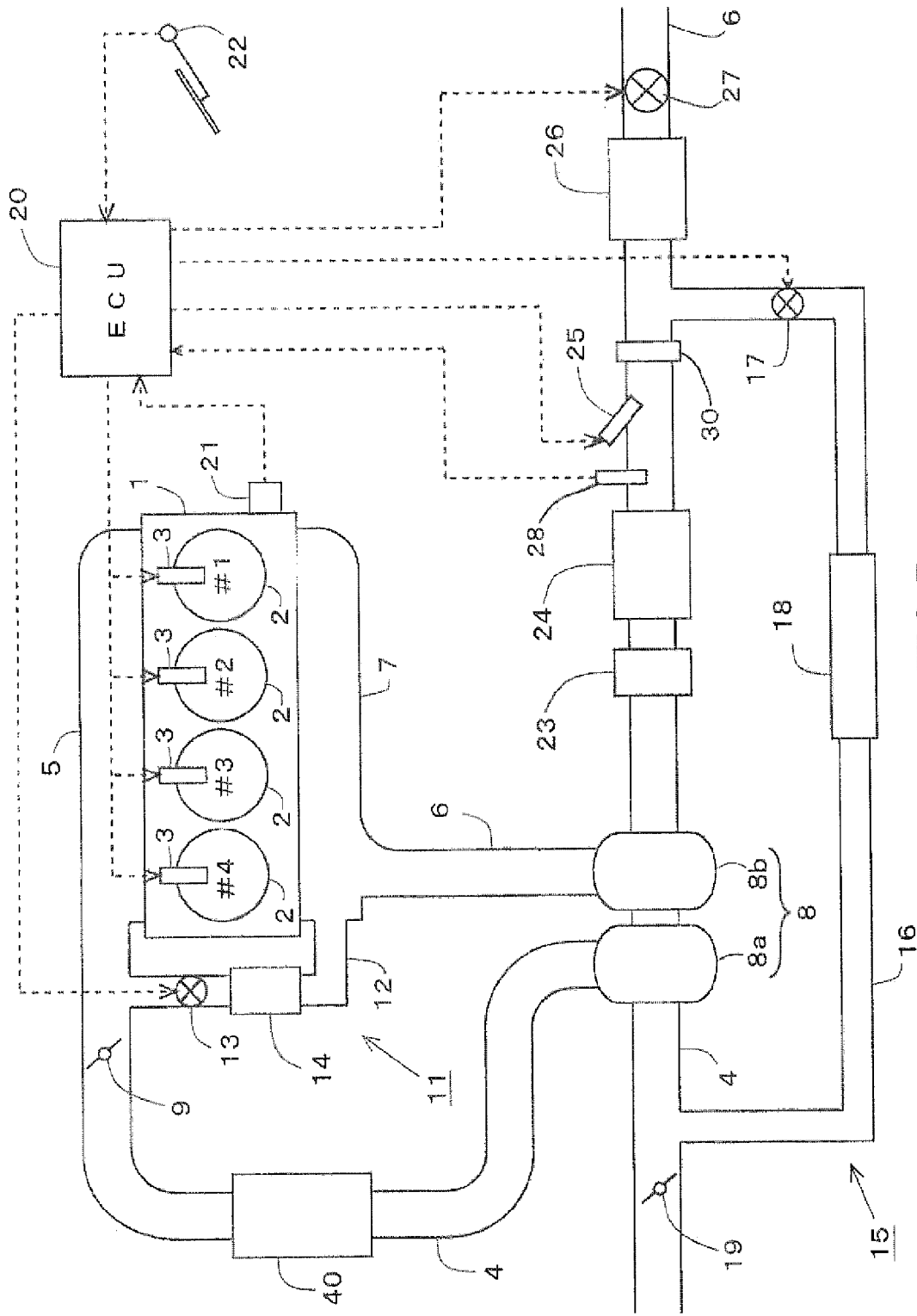
FIG. 5 is a view showing another construction example of an exhaust gas purification system for an internal combustion engine in the third embodiment of the present invention.

Accordingly, a catalyst 30 for hydrolysis may be arranged in a portion of the exhaust passage 6 at the downstream side of the addition valve 25 and at the upstream side of the connection portion of the low pressure EGR passage 16, as shown in FIG. 5. In that case, even in cases where the temperature of the exhaust gas is lower than the reference temperature, it becomes possible to carry out acid neutralization processing as long as the hydrolysis catalyst 30 is in an active state.

The hydrolysis catalyst may instead be arranged in the low pressure EGR passage 16. However, when the hydrolysis catalyst is arranged in the low pressure EGR passage 16, it may become difficult for the exhaust gas to flow from the exhaust passage 6 into the low pressure EGR passage 16 due to pressure loss of the catalyst. In such a case, it becomes necessary to make small the degree of opening of the exhaust throttle valve 27, so the back pressure of the internal combustion engine 1 will rise. For this reason, it is desirable that the hydrolysis catalyst be arranged in that portion of the exhaust passage 6 which is at the downstream side of the addition valve 25 and at the upstream side of the low pressure EGR passage 16, as shown in FIG. 5 referred to above.

In addition, a heating device for heating the exhaust gas may be arranged instead of the above-mentioned hydrolysis catalyst. As the heating device, there can be exemplified an electric heater that serves to convert electrical energy into thermal or heat energy.

However, in cases where the acid neutralization processing is carried as referred to above, the amount of oxygen introduced into combustion chambers of the internal combustion engine 1 after the deceleration fuel cut-off control has been terminated may become excessively small. Moreover, carbon dioxide ($CO_2$) and water ($H_2O$), which have been produced by the hydrolysis of the urea aqueous solution will also be introduced into the combustion chambers. As a result, it is considered that the combustion stability of the internal combustion engine 1 falls or a misfire occurs, immediately after the termination of the deceleration fuel cut-off control.

Accordingly, in cases where the acid neutralization processing is carried out during the execution of the deceleration fuel cut-off control, the ECU 20 may carry out processing to make the degree of opening of the low pressure EGR valve 17 in a predetermined period of time after the termination of the deceleration fuel cut-off control smaller than a target degree of opening (i.e., a target degree of opening which is decided according to the operational condition of the internal combustion engine 1), or may carry out processing to cause the low pressure EGR valve 17 to close (hereinafter referred to as "scavenging processing").

The above-mentioned predetermined period of time is a period of time taken until the gas existing in a portion of the intake passage 4 at the downstream side of the connection portion of the low pressure EGR passage 16 has been scavenged. The predetermined period of time can be calculated by using, as parameters, the volume of a path extending from the connection portion of the low pressure EGR passage 16 to the combustion chambers of the internal combustion engine 1, and the number of engine revolutions per unit time (the amount of gas which is taken in per unit time by the internal combustion engine 1).

When the scavenging processing as stated above is carried out, it is possible to avoid the situation where after the termination of the deceleration fuel cut-off control, the amount of oxygen introduced into each of the combustion chambers of the internal combustion engine 1 becomes short, or the amount of carbon dioxide ($CO_2$) or water ($H_2O$) becomes excessive. As a result, it is also possible to avoid the situation where the combustion stability of the internal combustion engine 1 becomes low or a misfire occurs, after the termination of the deceleration fuel cut-off control.

Here, note that after the termination of the above-mentioned scavenging processing, it is necessary to increase the amount of low pressure EGR gas introduced into the combustion chambers of the internal combustion engine 1 to a target amount (i.e., a target amount of low pressure EGR gas in the case where the acid neutralization processing and the scavenging processing are not carried out). However, some time will be taken before the low pressure EGR gas arrives at each of the combustion chambers of the internal combustion engine 1, and hence, the amount of low pressure EGR gas introduced into each of the combustion chambers of the internal combustion engine 1 after the termination of the scavenging processing may be short or insufficient. If the low pressure EGR gas runs short, there can be a situation where the amount of production of nitrogen oxides (NOx) increases, or a situation where combustion noise becomes large.

To cope with such situations, the ECU 20 may correct or adjust the degree of opening of the high pressure EGR valve 13 after the termination of the scavenging processing in a more open (increasing) direction from a degree of opening thereof in the case where the scavenging processing is not carried out. An amount of correction or adjustment in that case may be a fixed value, or may be a variable value which is changed according to an amount of shortage of the low pressure EGR gas.

In addition, in this embodiment, reference has been made to an example in which acid neutralization processing is carried out on the condition that deceleration fuel cut-off control is being executed, but acid neutralization processing may instead be carried out on the condition that deceleration fuel cut-off control is being executed, and the hydrogen ion exponent (pH) of a substance existing in the path of the low pressure EGR gas is not more than the predetermined value. In that case, it is possible to suppress the amount of the urea aqueous solution supplied from the addition valve 25 to a necessity minimum.

Fourth Embodiment

Next, a fourth embodiment of the present invention will be described with reference to FIGS. 6 through 8. Here, a construction different from that of the above-mentioned first embodiment will be described, and an explanation of the same construction will be omitted.

The difference of this fourth embodiment from the above-mentioned first embodiment is that the selective reduction type catalyst 26 is arranged in a portion of the exhaust passage 6 at the upstream side of the connection portion of the low pressure EGR passage 16.

Figure 6:
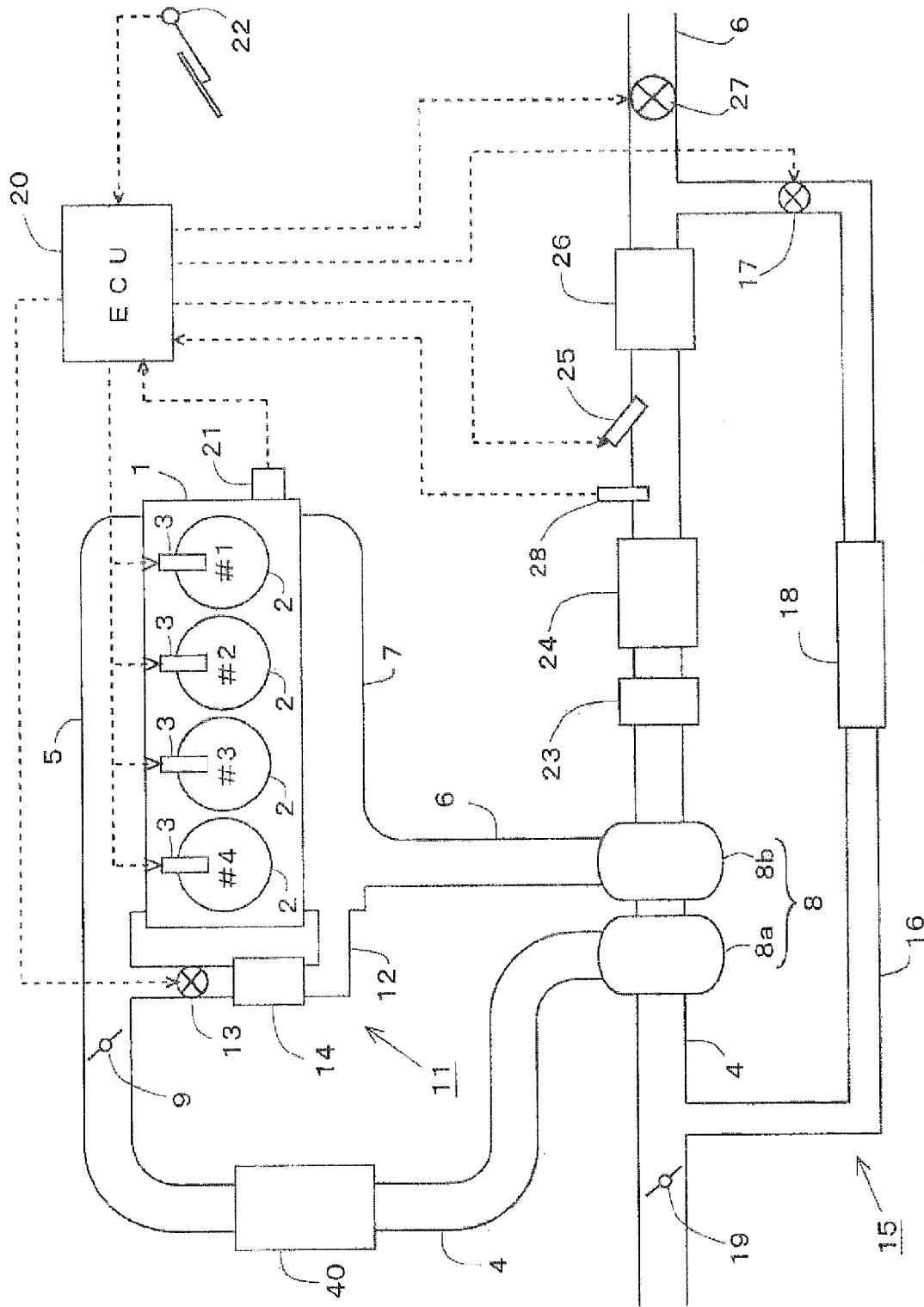
FIG. 6 is a view showing the schematic construction of an exhaust gas purification system for an internal combustion engine in a fourth embodiment of the present invention.

FIG. 6 is a view showing the schematic construction of an exhaust gas purification system for an internal combustion engine in this fourth embodiment. In FIG. 6, the selective reduction type catalyst 26 is arranged in that portion of the exhaust passage 6 which is at the upstream side of the connection portion of the low pressure EGR passage 16 and at the downstream side of the addition valve 25.

When acid neutralization processing is carried out in the construction in which the selective reduction type catalyst 26 is arranged in the portion of the exhaust passage 6 at the upstream side of the connection portion of the low pressure EGR passage 16, the ammonia ($NH_3$) supplied from the addition valve 25 will be adsorbed to the selective reduction type catalyst 26.

However, the amount of ammonia ($NH_3$) which can be adsorbed by the selective reduction type catalyst 26 is limited. Accordingly, in the acid neutralization processing in this embodiment, the ECU 20 serves to control the addition valve 25 in such a manner that an amount of ammonia ($NH_3$), which is more than an amount of ammonia ($NH_3$) which can be adsorbed by the selective reduction type catalyst 26 (hereinafter referred to as an "amount of saturation of ammonia"), is supplied to the selective reduction type catalyst 26.

In the following, an execution procedure of the acid neutralization processing in this embodiment will be described refer to FIG. 7. FIG. 7 is a flow chart showing a control routine which the ECU 20 carries out at the time of executing the acid neutralization processing. This control routine has been beforehand stored in the ROM of the ECU 20, etc., and is carried out by the ECU 20 in a periodical manner.

Figure 7:
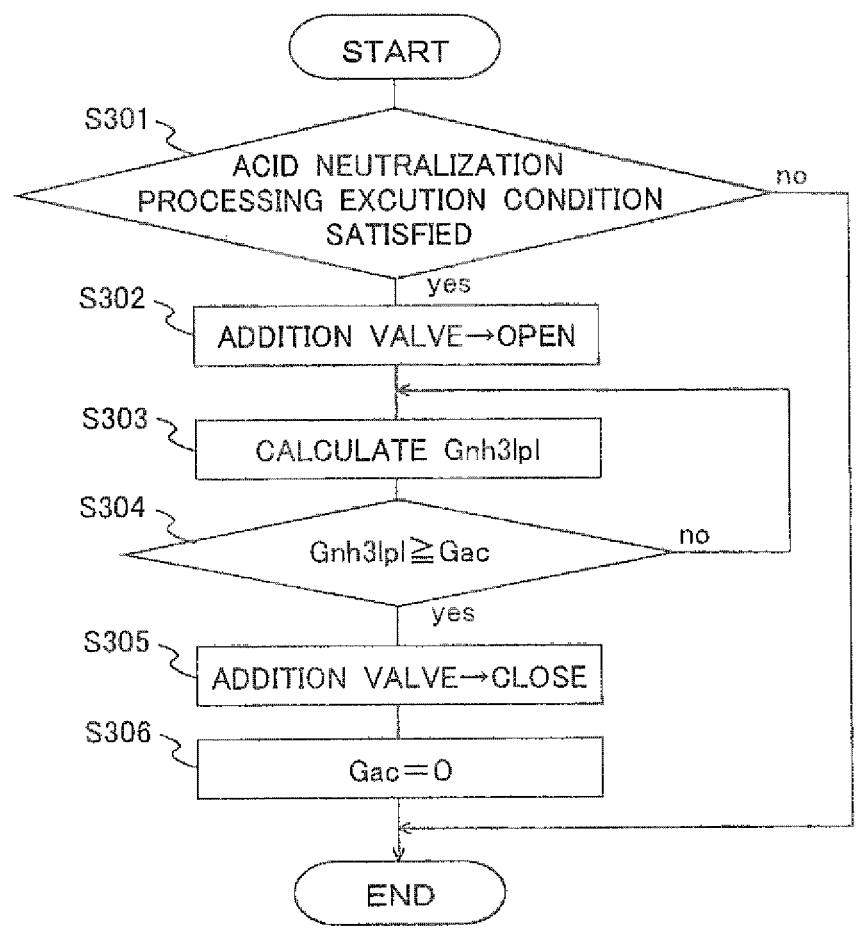
FIG. 7 is a flow chart showing an acid neutralization processing routine in the fourth embodiment of the present invention.

In the control routine of FIG. 7, first in step S301, the ECU 20 determines whether an execution condition for the acid neutralization processing is satisfied. The acid neutralization processing execution condition is satisfied, for example, when an amount (i.e., an amount of ions or a molar quantity) Gac of the acidic substances existing in the path of the low pressure EGR gas exceeds a threshold value, and when the low pressure EGR valve 17 is in a valve open state.

Here, note that as a method of obtaining the amount Gac of the acidic substances existing in the path of the low pressure EGR gas, there can be exemplified a method of obtaining it from a map or a computational model using, as an argument, an operational history of the internal combustion engine 1 (e.g., an integrated value of the number of engine revolutions per unit time, an integrated value of an amount of fuel injection, an integrated value of the low pressure EGR gas, etc.), or a method of obtaining it from a map or a computational model using, as an argument, an integrated amount of the nitrogen oxides (NOx) which has flowed into the low pressure EGR gas passage 16, a temperature in the path of the low pressure EGR gas, or the like. By obtaining the amount Gac of the acidic substances according to such a method by means of the ECU 20, an obtaining means according to the present invention is achieved.

In cases where a negative determination is made in the above-mentioned step S301, the ECU 20 once terminates the execution of this routine. On the other hand, in cases where an affirmative determination is made in the above-mentioned step S301, the process of the ECU 20 goes to step S302.

In S302, the ECU 20 starts to supply an urea aqueous solution by causing the addition valve 25 to open. In that case, the ECU 20 regulates the amount of the urea aqueous solution to be supplied in such a manner that an amount of ammonia ($NH_3$) more than the amount of saturation of ammonia of the selective reduction type catalyst 26 is supplied to the selective reduction type catalyst 26.

Figure 8:
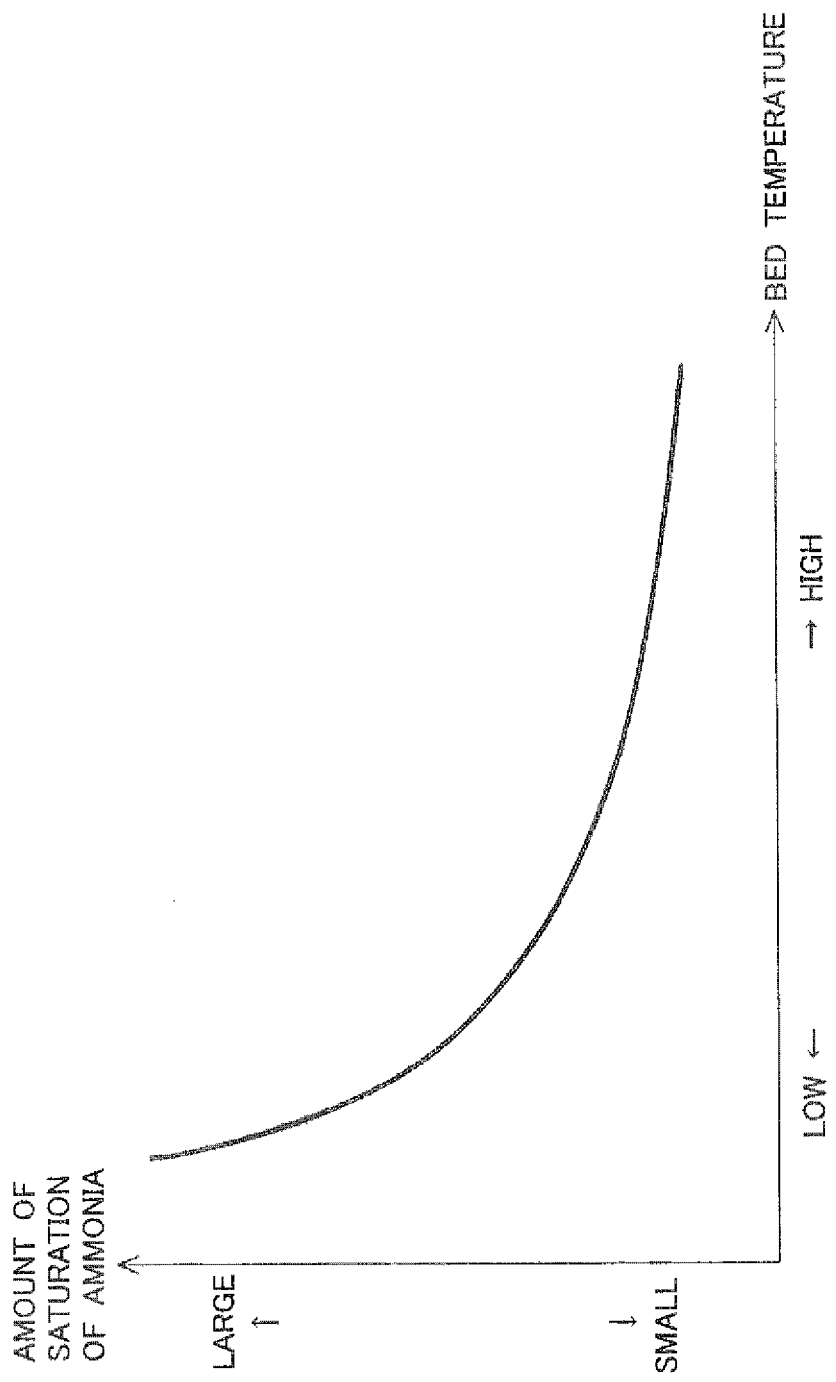
FIG. 8 is a view showing the relation between an amount of saturation of ammonia and a bed temperature of a selective reduction type catalyst.

FIG. 8 is a view showing the relation between the amount of saturation of ammonia in the selective reduction type catalyst 26 and the bed temperature of the selective reduction type catalyst 26. As shown in FIG. 8, the amount of saturation of ammonia in the selective reduction type catalyst 26 changes according to the bed temperature of the selective reduction type catalyst 26. For example, when the bed temperature of the selective reduction type catalyst 26 is low, the amount of saturation of ammonia becomes larger than when the bed temperature of the selective reduction type catalyst 26 is high. Accordingly, the ECU 20 calculates the amount of saturation of ammonia by using the bed temperature of the selective reduction type catalyst 26 as a parameter, and controls the addition valve 25 in such a manner that an amount of ammonia ($NH_3$) more than the amount of saturation of ammonia is supplied to the selective reduction type catalyst 26.

When an amount of ammonia ($NH_3$) more than the amount of saturation of ammonia is supplied to the selective reduction type catalyst 26 in this manner, an excessive or surplus amount of ammonia ($NH_3$), which has not been adsorbed by the selective reduction type catalyst 26, will flow to the downstream of the selective reduction type catalyst 26. A part of ammonia ($NH_3$) having flowed to the downstream of the selective reduction type catalyst 26 flows into the low pressure EGR passage 16 together with the low pressure EGR gas. The ammonia ($NH_3$), which has flowed into the low pressure EGR passage 16, acts as a neutralizing agent for the acidic substances existing in the path of the low pressure EGR gas.

Here, returning to the control routine of FIG. 7, the ECU 20 calculates, in step S303, a total amount Gnh31p1 of the ammonia ($NH_3$) which has flowed into the low pressure EGR passage 16. Specifically, the ECU 20 first obtains the amount of the ammonia ($NH_3$) which flows out of the selective reduction type catalyst 26. That is, the ECU 20 calculates a concentration Cnh3r1 of the ammonia ($NH_3$) contained in the exhaust gas which flows out of the selective reduction type catalyst 26. The concentration Cnh3r1 of the ammonia ($NH_3$) contained in the exhaust gas may be obtained by means of a map or a computational model which uses, as arguments, the bed temperature of the selective reduction type catalyst 26 and the flow speed of the exhaust gas, or it may be obtained by means of a map or a computational model which uses, as arguments, the flow rate of the exhaust gas and the detected value of an ammonia sensor.

Subsequently, the ECU 20 obtains the amount of the exhaust gas flowing from the exhaust passage 6 into the low pressure EGR passage 16, i.e., the amount of low pressure EGR gas G1p1. The amount of low pressure EGR gas G1p1 can be obtained by means of a map or a computational model which uses, as arguments, the operational condition (the amount of intake air, the number of engine revolutions per unit time, etc.) of the internal combustion engine 1, the degree of opening of the low pressure EGR valve 17, the degree of opening of the exhaust throttle valve 27, and so on.

The ECU 20 calculates an amount (=Cnh3r1*G1p1) of the ammonia ($NH_3$) to be introduced into the low pressure EGR passage 16 by multiplying the concentration Cnh3r1 of ammonia ($NH_3$) and the amount of low pressure EGR gas G1p1 together. Moreover, the ECU 20 calculates the above-mentioned total amount Gnh31p1 (=Σ(Cnh3r1*G1p1)) by integrating the amount of the ammonia ($NH_3$) introduced into the low pressure EGR passage 16.

In step S304, the ECU 20 determines whether the total amount Gnh31p1 obtained in the above-mentioned step S303 is not less than the amount Gac of acidic substances which was calculated in the above-mentioned step S301. In cases where a negative determination is made in step S304 (Gnh31p1<Gac), the ECU 20 returns to the above-mentioned step S303. On the other hand, in cases where an affirmative determination is made in step S304 (Gnh31p1≥Gac), the process of the ECU 20 goes to step S305, in which the addition valve 25 is caused to close.

Subsequently, in step S306, the ECU 20 resets the calculated value of the amount Gac of the acidic substances existing in the path of the low pressure EGR gas to zero, and terminates the execution of this routine.

According to the embodiment described above, even in the construction in which the selective reduction type catalyst 26 is arranged at the upstream side of the connection portion of the low pressure EGR passage 16, the acidic substances existing in the path of the low pressure EGR gas can be neutralized. Moreover, according to this embodiment, the amount of supply of the urea aqueous solution is regulated according to the amount of the acidic substances existing in the path of the low pressure EGR gas, and hence, the amount of consumption of the urea aqueous solution accompanying the execution of acid neutralization processing can be suppressed to a necessity minimum.

Here, note that when acid neutralization processing is carried out in the construction in which the selective reduction type catalyst 26 is arranged in a portion of the exhaust passage 6 at the upstream side of the connection portion of the low pressure EGR passage 16, a part of the ammonia ($NH_3$) having flowed out of the selective reduction type catalyst 26 flows into the low pressure EGR passage 16, but the remaining ammonia ($NH_3$) will be discharged into the atmospheric air. Accordingly, a catalyst for oxidizing ammonia ($NH_3$) may be arranged in a portion of the exhaust passage 6 at the downstream side of the connection portion of the low pressure EGR passage 16.

Fifth Embodiment

Next, a fifth embodiment of the present invention will be described with reference to FIG. 9. Here, a construction different from that of the above-mentioned fourth embodiment will be described, and an explanation of the same construction will be omitted.

The difference of this fourth embodiment from the above-mentioned fourth embodiment is that in cases where acid neutralization processing is carried out during the execution of deceleration fuel cut-off control, the exhaust throttle valve 27 is caused to close.

In the following, an execution procedure of the acid neutralization processing in this embodiment will be described refer to FIG. 9. FIG. 9 is a flow chart showing a control routine which is executed by the ECU 20 at the time when the acid neutralization processing is carried out in this embodiment. Here, note that in FIG. 9, the same symbols are attached to the same processes as those in the above-mentioned control routine of the fourth embodiment (see FIG. 7).

Figure 9:
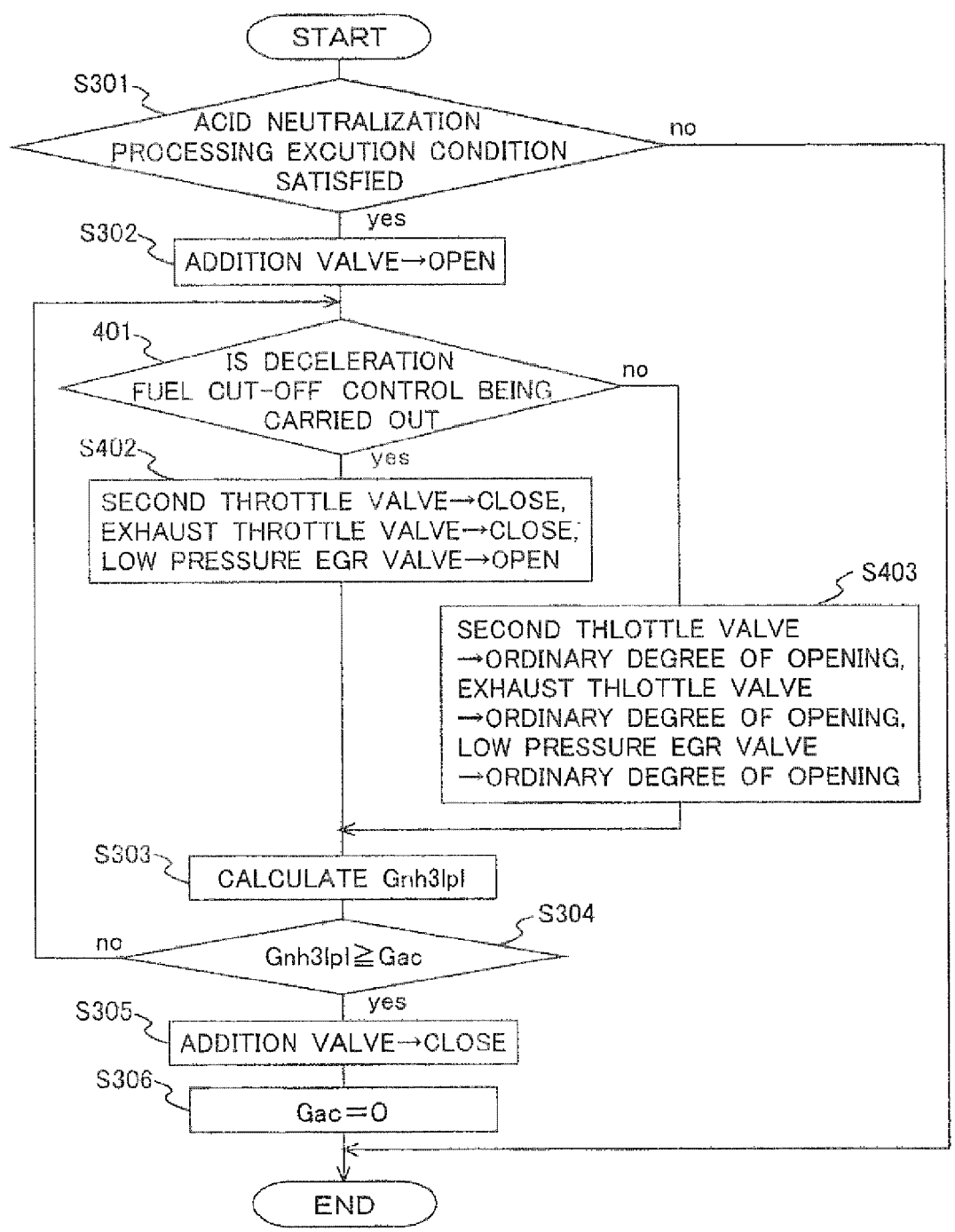
FIG. 9 is a flow chart showing an acid neutralization processing routine in a fifth embodiment of the present invention.

In the control routine of FIG. 9, the ECU 20 carries out the processing of step S401 after having executed the processing of S302. In step S401, the ECU 20 determines whether deceleration fuel cut-off control is being carried out.

In cases where an affirmative determination is made in the above-mentioned step S401, the process of the ECU 20 goes to step S402, in which the second throttle valve 19 and the exhaust throttle valve 27 are caused to close, and at the same time, the low pressure EGR valve 17 is caused to open. When the acid neutralization processing is carried out in such a state, all of the ammonia ($NH_3$) having flowed out of the selective reduction type catalyst 26 will flow into the low pressure EGR passage 16. In other words, all of the ammonia ($NH_3$) having flowed out of the selective reduction type catalyst 26 can be used as a neutralizing agent. As a result, the acidic substances can be neutralized, while suppressing the amount of consumption of the urea aqueous solution accompanying the execution of the acid neutralization processing to a small level.

In addition, in cases where a negative determination is made in the above-mentioned step S401, the process of the ECU 20 goes to step S403, in which the degrees of opening of the second throttle valve 19, the exhaust throttle valve 27 and the low pressure EGR valve 17 are controlled to their ordinary degrees of opening, respectively.

Here, note that in this embodiment, reference has been made to an example in which acid neutralization processing is carried out even at the time of non-execution of deceleration fuel cut-off control, but acid neutralization processing may be carried out only at the time of execution of deceleration fuel cut-off control. In that case, it is possible to suppress the amount of consumption of the urea aqueous solution accompanying the execution of the acid neutralization processing to a much smaller level.

Sixth Embodiment

Next, a sixth embodiment of the present invention will be described with reference to FIGS. 10 through 12. Here, a construction different from that of the above-mentioned fourth embodiment will be described, and an explanation of the same construction will be omitted.

The difference of this sixth embodiment from the above-mentioned fourth embodiment is that provision is made for a heating means for heating the selective reduction type catalyst 26, and that the heating means is caused to operate during the execution of acid neutralization processing.

Figure 10:
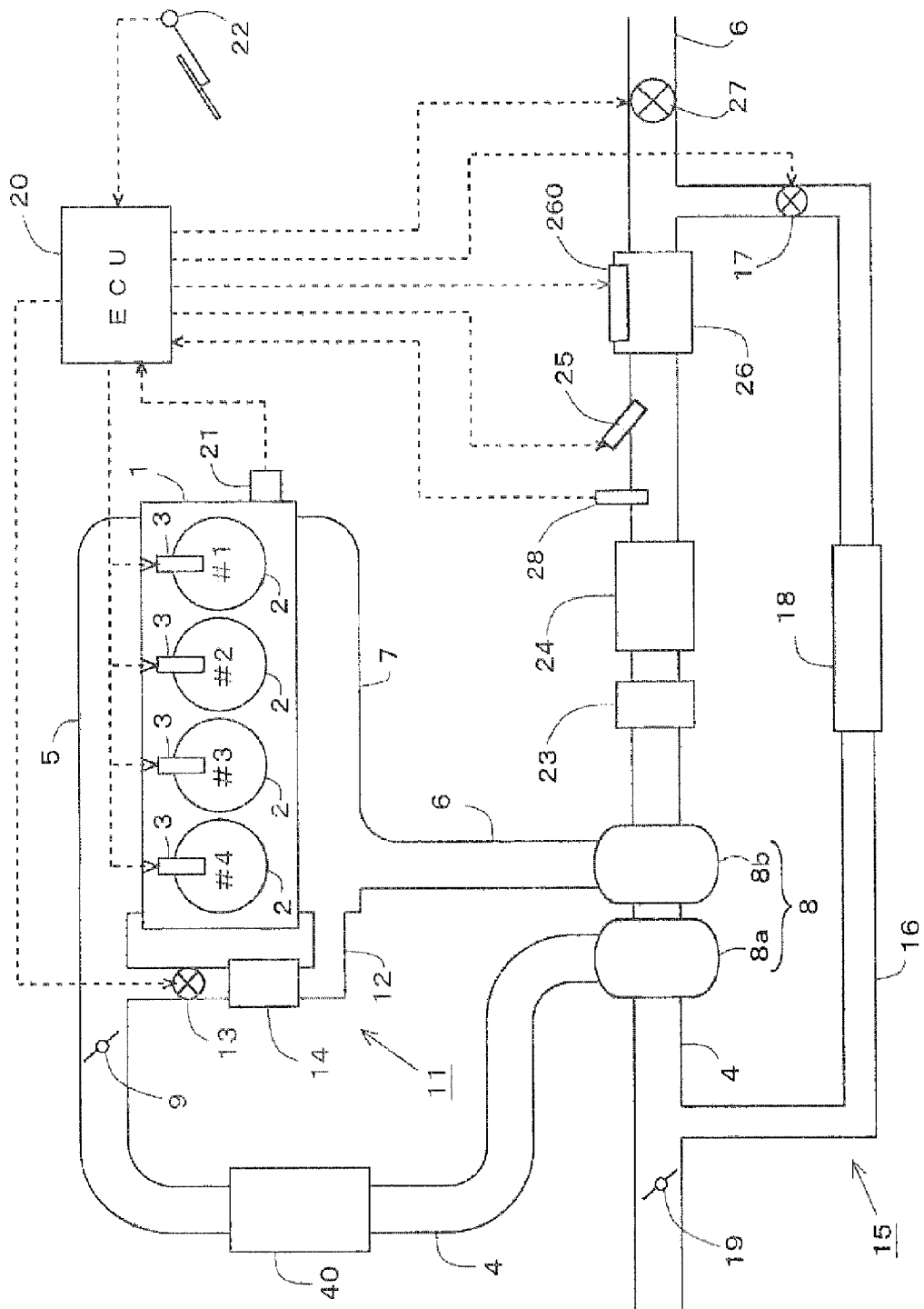
FIG. 10 is a view showing the schematic construction of an exhaust gas purification system for an internal combustion engine in a sixth embodiment of the present invention.

FIG. 10 is a view showing the schematic construction of an exhaust gas purification system for an internal combustion engine in this sixth embodiment. In FIG. 10, a heater 260 for heating the selective reduction type catalyst 26 is mounted on the selective reduction type catalyst 26. The heater 260 is to convert the electrical energy supplied from a battery into thermal or heat energy thereby to heat the selective reduction type catalyst 26. The other construction of this sixth embodiment is the same as that of the above-mentioned fourth embodiment.

In cases where acid neutralization processing is carried out in the exhaust gas purification system for an internal combustion engine as constructed in this manner, the ECU 20 causes the urea aqueous solution to be supplied from the addition valve 25, and at the same time, operates the heater 260.

Specifically, when the execution condition for acid neutralization processing is satisfied, the ECU 20 obtains the bed temperature of the selective reduction type catalyst 26, and decides a target value for the amount of adsorption of ammonia (a target amount of supply thereof) based on the bed temperature thus obtained. The target amount of supply in that case is set to an amount which is smaller than the amount of saturation of ammonia.

Subsequently, the ECU 20 causes the addition valve 25 to open in accordance with the target amount of supply, and at the same time, operates the heater 260. When the bed temperature of the selective reduction type catalyst 26 is high, the amount of saturation of ammonia becomes smaller than when the bed temperature of the selective reduction type catalyst 26 is low. For that reason, as the selective reduction type catalyst 26 is heated by means of the heater 260, the amount of saturation of ammonia will come to be less than the target amount of supply. As a result, a part of the ammonia ($NH_3$) supplied to the selective reduction type catalyst 26 will flow to the downstream of the selective reduction type catalyst 26.

Figure 11:
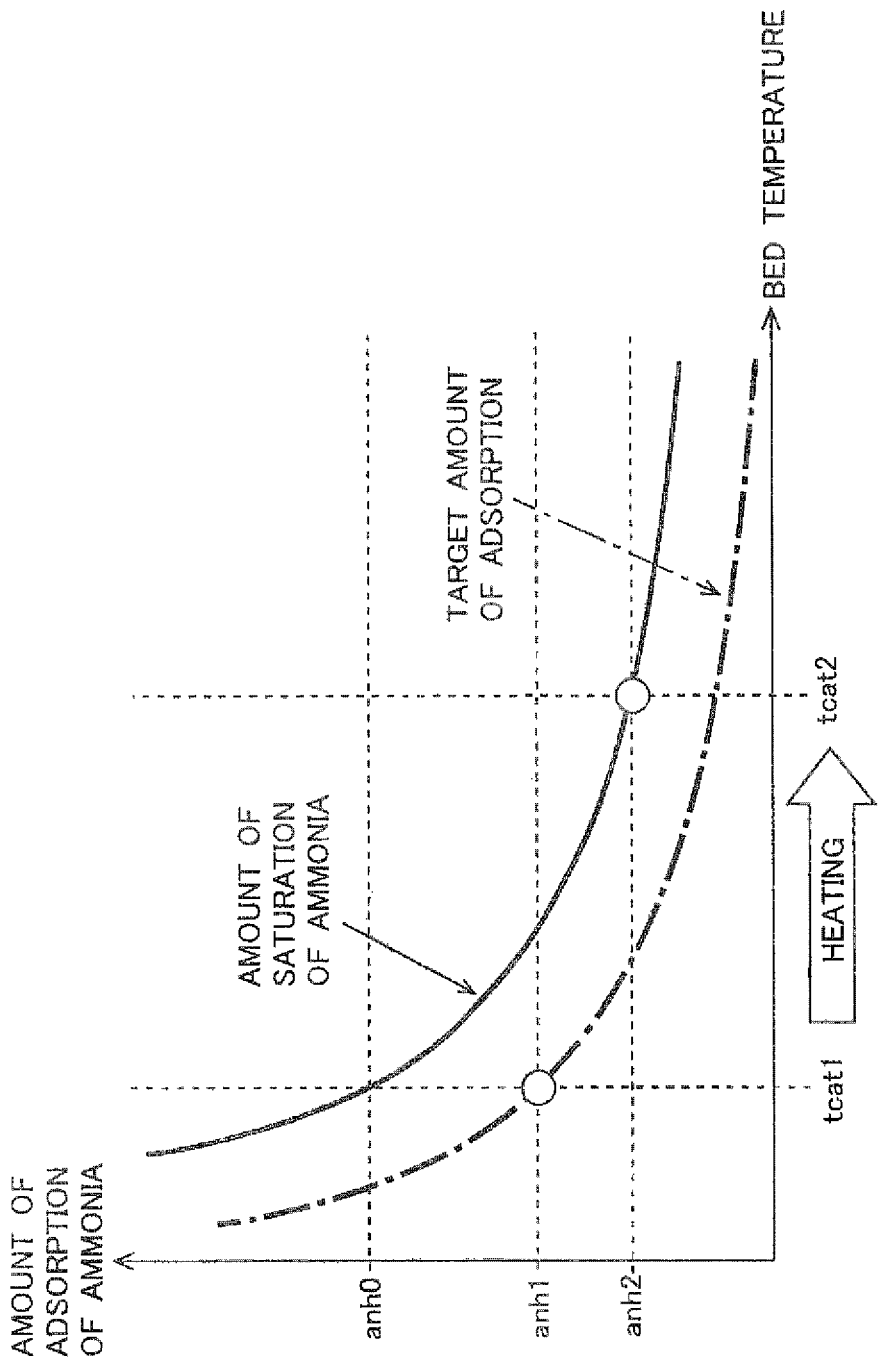
FIG. 11 is a view showing the change of a bed temperature of a selective reduction type catalyst and the change of an amount of adsorption of ammonia thereof when acid neutralization processing has been carried out in the sixth embodiment of the present invention.

Here, the change of the bed temperature of the selective reduction type catalyst 26 and the change of the amount of adsorption of ammonia thereof when acid neutralization processing has been carried out are shown in FIG. 11. A solid line in FIG. 11 indicates the amount of saturation of ammonia, and an alternate long and short dashed line indicates the target value for the amount of adsorption of ammonia (in other words, the target amount of supply of ammonia ($NH_3$)). In addition, a symbol tcat1 in FIG. 11 indicates a bed temperature of the selective reduction type catalyst 26 when the execution condition for acid neutralization processing has been satisfied, and a symbol tcat2 indicates a bed temperature when the selective reduction type catalyst 26 has been heated by means of the heater 260. Moreover, a symbol anh0 in FIG. 11 indicates an amount of saturation of ammonia when the bed temperature of the selective reduction type catalyst 26 is tcat1; a symbol anh1 (<anh0) indicates the target amount of supply of ammonia ($NH_3$) in the acid neutralization processing; and a symbol anh2 (<anh1) indicates an amount of saturation of ammonia (an amount of adsorption of ammonia) when the bed temperature of the selective reduction type catalyst 26 has risen to tcat2.

As shown in FIG. 11, when the bed temperature of the selective reduction type catalyst 26 goes up from tcat1 to tcat2, the amount of saturation of ammonia decreases from anh0 to anh2. Because the amount of saturation of ammonia anh2 is less than the target amount of supply anh1, a surplus amount (=anh1−anh2) of ammonia ($NH_3$) will flow to a portion of the exhaust passage 6 at the downstream side of the selective reduction type catalyst 26. A part of the ammonia ($NH_3$) having flowed to the portion of the exhaust passage 6 at the downstream side of the selective reduction type catalyst 26 flows into the low pressure EGR passage 16, and acts as a neutralizing agent for the acidic substances.

When the selective reduction type catalyst 26 is heated in this manner at the time of the execution of the acid neutralization processing, it becomes unnecessary to supply to the selective reduction type catalyst 26 an amount of ammonia ($NH_3$) which is larger than the amount of saturation of ammonia (i.e., the amount of saturation of ammonia corresponding to the bed temperature at the time when the execution condition for acid neutralization processing has been satisfied). As a result, it is possible to suppress an increase in the amount of consumption of the urea aqueous solution accompanying the execution of the acid neutralization processing to a small level.

In addition, because the operation of the heater 260 is stopped after the acid neutralization processing has been completed, the bed temperature of the selective reduction type catalyst 26 drops. As the bed temperature of the selective reduction type catalyst 26 drops, the amount of saturation of ammonia increases. As a result, a margin is generated for the ammonia adsorption capacity of the selective reduction type catalyst 26, thus making it possible to avoid the situation where ammonia ($NH_3$) flows out to the downstream side of the selective reduction type catalyst 26.

In the following, an execution procedure of the acid neutralization processing in this embodiment will be described refer to a flow chart of FIG. 12. FIG. 12 is a flow chart showing a control routine which is executed by the ECU 20 at the time when the acid neutralization processing is carried out. In FIG. 12, the same symbols are attached to the same processes as those in the above-mentioned control routine of the fourth embodiment (see FIG. 7).

Figure 12:
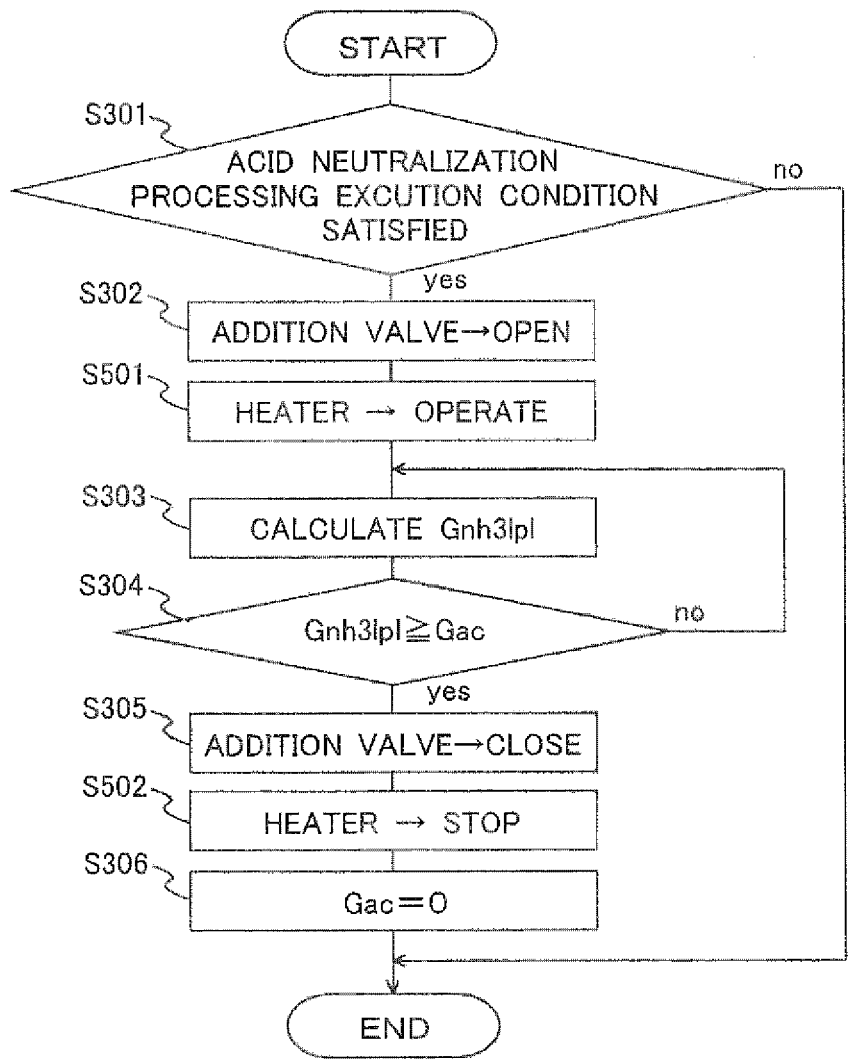
FIG. 12 is a flow chart showing an acid neutralization processing routine in a sixth embodiment of the present invention.

In the control routine of FIG. 12, the ECU 20 carries out the processing of step S501 after having executed the processing of S302. In step S501, the ECU 20 causes the heater 260 to operate. Here, note that in step S302 of this routine, the ECU 20 is assumed to control the addition valve 25 in such a manner that the amount (the target amount of supply) anh1 of the ammonia ($NH_3$) supplied to the selective reduction type catalyst 26 becomes less than the amount of saturation of ammonia anh0, as referred to in the above-mentioned description of FIG. 11.

The ECU 20 carries out the processing of steps S303 through S305 after the execution of the processing of step S501. Here, note that in cases where the amount of the ammonia ($NH_3$) flowing out of the selective reduction type catalyst 26 is obtained in step S303, the ECU 20 is assumed to use a bed temperature tcat at the present point in time, the target amount of supply anh1, and a map as shown in the above-mentioned FIG. 11. That is, the ECU 20 obtains the amount of saturation of ammonia anh corresponding to the bed temperature tcat at the present point in time from the map of FIG. 11. Subsequently, the ECU 20 calculates the amount of the ammonia ($NH_3$) flowing out of the selective reduction type catalyst 26 by subtracting the amount of saturation of ammonia anh from the target amount of supply anh1.

The ECU 20 carries out the processing of step S502 after the execution of the processing of step S305. In step S502, the ECU 20 causes the heater 260 to stop. In that case, the bed temperature of the selective reduction type catalyst 26 drops, so the amount of saturation of ammonia increases. As a result, it is possible to avoid the situation where ammonia ($NH_3$) flows out of the selective reduction type catalyst 26 after the termination of the acid neutralization processing.

According to the embodiment described above, the acidic substances in the path of the low pressure EGR gas can be neutralized, while suppressing the amount of consumption of the urea aqueous solution to a smaller level than in the above-mentioned fourth embodiment.

Here, note that in cases where a negative determination is made in step S304 of the above-mentioned control routine, the ECU 20 may increase the amount of the urea aqueous solution to be supplied from the addition valve 25, as long as an amount of adsorption of ammonia at that point in time is less than a remaining amount of the acidic substances (=Gac−Gnh31p1). In that case, it becomes possible to neutralize the acidic substances existing in the path of the low pressure EGR gas in a more reliable manner.

In addition, in this embodiment, the heater mounted on the selective reduction type catalyst 26 has been exemplified as a means for heating the selective reduction type catalyst 26, but a heater may instead be arranged in such a manner as to heat the exhaust gas flowing into the selective reduction type catalyst 26.

As other methods of achieving the heating means, the temperature of the exhaust gas flowing into the selective reduction type catalyst 26 may be raised by carrying out at least one of the following control operations by means of the ECU 20, i.e., a control operation to correct or adjust the degree of opening of the second throttle valve 19 to a closed side, a control operation to cause the amount of the low pressure EGR gas or the high pressure EGR gas to increase, a control operation to correct or adjust the degree of opening of the exhaust throttle valve 27 to a closed side, a control operation to retard the fuel injection timing of the fuel injection valve 3 (i.e., a control operation to retard the combustion timing of fuel), and a control operation to supply unburnt fuel to the oxidation catalyst 23.

In cases where the internal combustion engine 1 is provided with a mechanism capable of changing the valve opening timing of each exhaust valve, the temperature of the exhaust gas flowing into the selective reduction type catalyst 26 may be raised by advancing the valve opening timing of each exhaust valve by means of the ECU 20.

In cases where the turbocharger 8 is a variable capacity type turbo charger, the temperature of the exhaust gas flowing into the selective reduction type catalyst 26 may be raised by correcting the degree of opening of a nozzle vane of the variable capacity type turbo charger to an open side by means of the ECU 20.

Seventh Embodiment

Next, a seventh embodiment of the present invention will be described with reference to FIG. 13. Here, a construction different from that of the above-mentioned sixth embodiment will be described, and an explanation of the same construction will be omitted.

The difference of this seventh embodiment from the above-mentioned sixth embodiment is that in cases where acid neutralization processing is carried out during the execution of deceleration fuel cut-off control, the exhaust throttle valve 27 is caused to close.

In the following, an execution procedure of the acid neutralization processing in this embodiment will be described refer to FIG. 13. FIG. 13 is a flow chart showing a control routine which is executed by the ECU 20 at the time when the acid neutralization processing is carried out in this embodiment. Here, note that in FIG. 13, the same symbols are attached to the same processes as those in the above-mentioned control routine of the sixth embodiment (see FIG. 12).

Figure 13:
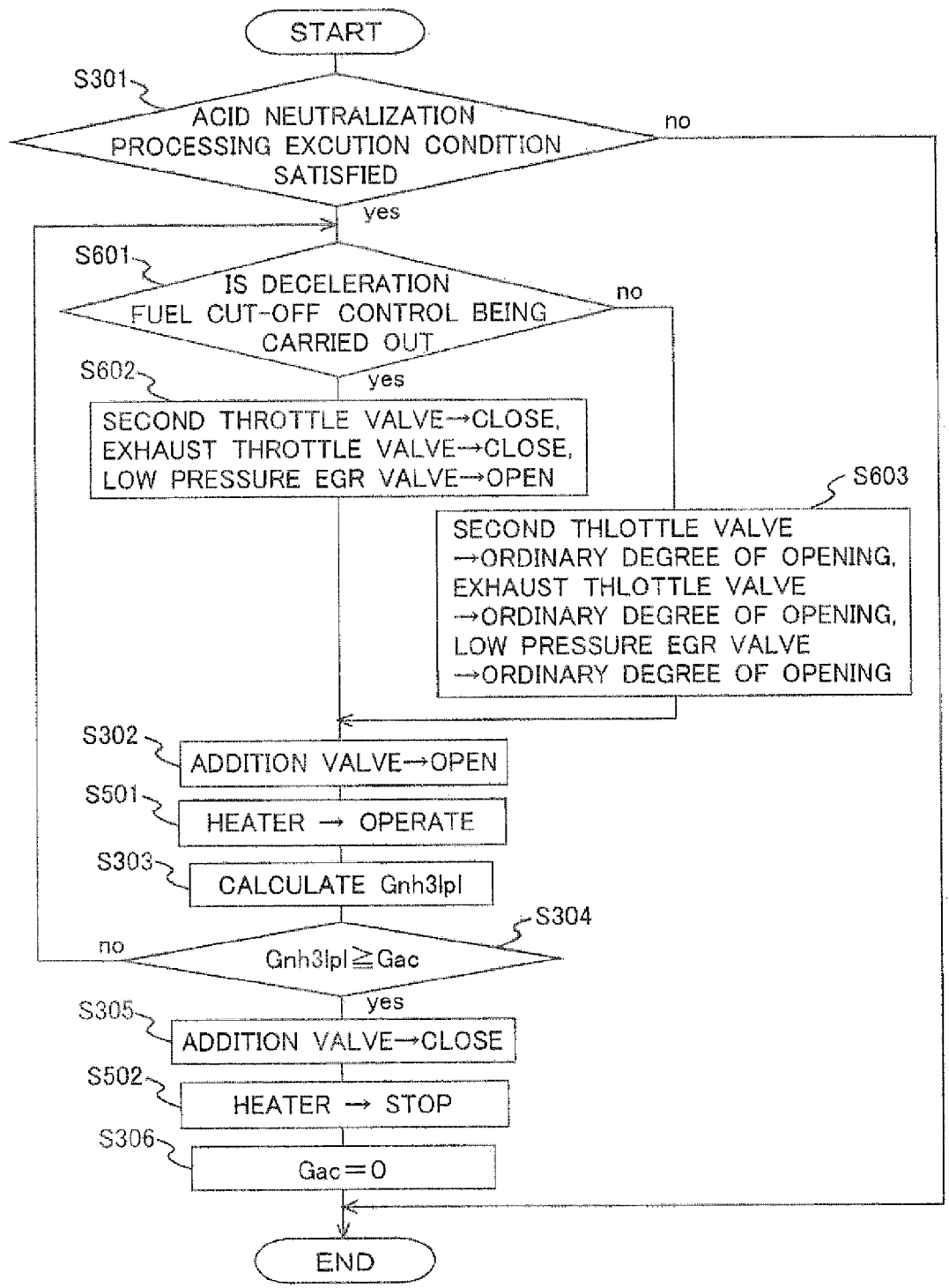
FIG. 13 is a flow chart showing an acid neutralization processing routine in a seventh embodiment of the present invention.

In the control routine of FIG. 13, in cases where an affirmative determination is made in step S301, the ECU 20 carries out the processing of steps S601 through S603 before the execution of the processing of step S302. First, in step S601, the ECU 20 determines whether deceleration fuel cut-off control is being carried out.

In cases where an affirmative determination is made in the above-mentioned step S601, the process of the ECU 20 goes to step S602, in which the second throttle valve 19 and the exhaust throttle valve 27 are caused to close, and at the same time, the low pressure EGR valve 17 is caused to open. When the acid neutralization processing is carried out in such a state, all of the ammonia ($NH_3$) having flowed out of the selective reduction type catalyst 26 will flow into the low pressure EGR passage 16. In other words, all of the ammonia ($NH_3$) having flowed out of the selective reduction type catalyst 26 can be used as a neutralizing agent. As a result, the acidic substances can be neutralized, while suppressing the amount of consumption of the urea aqueous solution accompanying the execution of the acid neutralization processing to a small level.

In addition, in cases where a negative determination is made in the above-mentioned step S601, the process of the ECU 20 goes to step S603, in which the degrees of opening of the second throttle valve 19, the exhaust throttle valve 27 and the low pressure EGR valve 17 are controlled to their ordinary degrees of opening, respectively.

Here, note that in this embodiment, reference has been made to an example in which acid neutralization processing is carried out even at the time of non-execution of deceleration fuel cut-off control, but acid neutralization processing may be carried out only at the time of execution of deceleration fuel cut-off control. In that case, it is possible to suppress the amount of consumption of the urea aqueous solution accompanying the execution of the acid neutralization processing to a much smaller level.

Eighth Embodiment

Next, a eighth embodiment of the present invention will be described with reference to FIG. 14. Here, a construction different from that of the above-mentioned first embodiment will be described, and an explanation of the same construction will be omitted.

The difference of this eighth embodiment from the above-mentioned first embodiment is that the amount of the urea aqueous solution to be supplied from the addition valve 25 is regulated (corrected) according to the amount of low pressure EGR gas at the time of the execution of acid neutralization processing.

In case where acid neutralization processing is carried out in the construction in which the selective reduction type catalyst 26 is arranged in a portion of the exhaust passage 6 at the downstream side of the connection portion of the low pressure EGR passage 16, a part of the urea aqueous solution added from the addition valve 25 will flow into the low pressure EGR passage 16, and the remaining urea aqueous solution will flow into the selective reduction type catalyst 26.

In that case, the amount of the urea aqueous solution (the amount of ammonia) flowing into the selective reduction type catalyst 26 changes in accordance with the amount of the low pressure EGR gas. That is, the amount of the urea aqueous solution flowing into the selective reduction type catalyst 26 becomes smaller in comparison with the time when the amount of the low pressure EGR gas is small. If the amount of the urea aqueous solution flowing into the selective reduction type catalyst 26 becomes excessively smaller, it will be a possibility that the selective reduction type catalyst 26 becomes unable to remove the nitrogen oxides (NOx) in the exhaust gas in an effective or practical manner.

On the other hand, in the acid neutralization processing of this embodiment, when the amount of the low pressure EGR gas is large, the amount of the urea aqueous solution supplied from the addition valve 25 is made to become larger in comparison with the time when the amount of the low pressure EGR gas is small. According to such a method, even in cases where the urea aqueous solution is supplied from the addition valve 25 at the time of the execution of the acid neutralization processing (at the time of the opening of the low pressure EGR valve 17), it becomes possible to supply a necessary amount of ammonia ($NH_3$) to the selective reduction type catalyst 26.

In the following, an execution procedure of the acid neutralization processing in this embodiment will be described refer to FIG. 14. FIG. 14 is a flow chart showing a control routine which is executed by the ECU 20 at the time when the acid neutralization processing is carried out. In FIG. 14, the same symbols are attached to the same processes as those in the above-mentioned control routine of the first embodiment (see FIG. 2).

Figure 14:
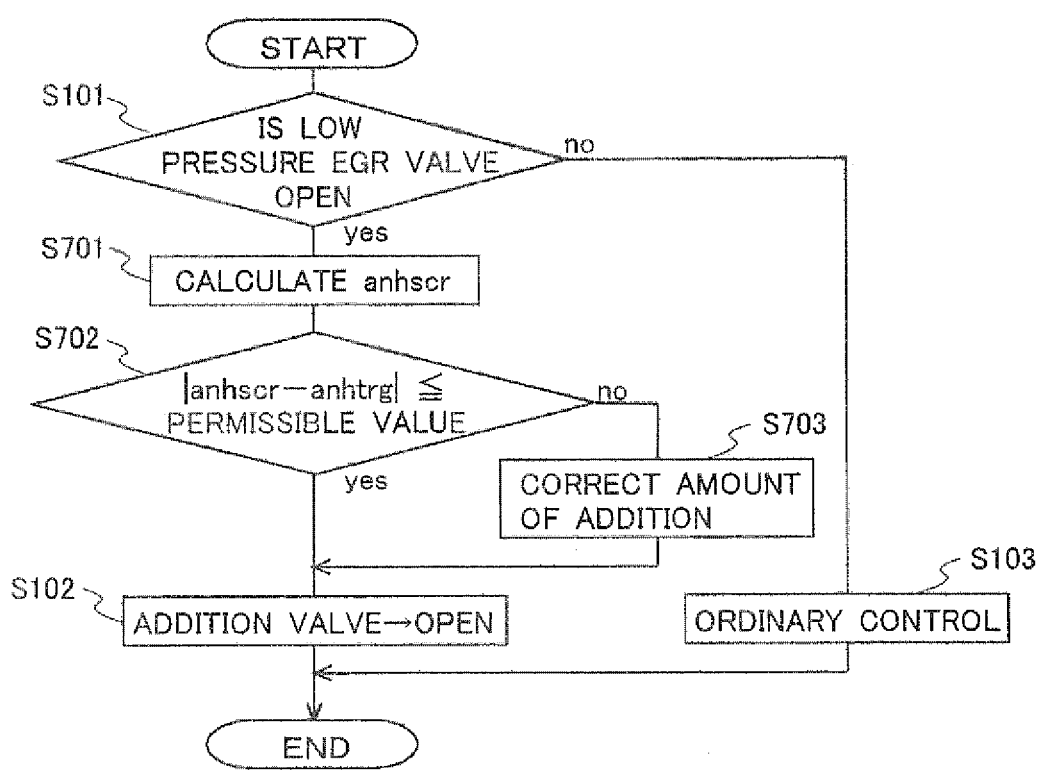
FIG. 14 is a flow chart showing an acid neutralization processing routine in an eighth embodiment of the present invention.

In the control routine of FIG. 14, in cases where an affirmative determination is made in step S101, the ECU 20 carries out the processing of step S701. In step S701, the ECU 20 calculates the amount anhscr of the ammonia ($NH_3$) supplied to the selective reduction type catalyst 26, in cases where it is assumed that a predetermined amount of urea aqueous solution has been added to the exhaust gas from the addition valve 25. The predetermined amount referred to herein may be a fixed amount which has been beforehand set, or may be a variable amount which is decided by using, as a parameter, the amount or hydrogen ion exponent (pH) of the acidic substances existing in the path of the low pressure EGR gas.

In calculating the amount anhscr of the ammonia ($NH_3$) supplied to the selective reduction type catalyst 26, the ECU 20 first calculates the concentration of ammonia ($NH_3$) contained in the exhaust gas by using, as parameters, an amount of the urea aqueous solution to be supplied from the addition valve 25 and a flow rate (amount) Gex of the exhaust gas. Subsequently, the ECU 20 obtains the amount of the exhaust gas flowing from the exhaust passage 6 into the low pressure EGR passage 16, i.e., the amount of low pressure EGR gas Glp1. The amount of low pressure EGR gas Glp1 can be obtained by means of a map or a computational model which uses, as arguments, the operational condition (the amount of intake air, the number of engine revolutions per unit time, etc.) of the internal combustion engine 1, the degree of opening of the low pressure EGR valve 17, the degree of opening of the exhaust throttle valve 27, and so on.

The ECU 20 calculates an amount Gscr of the exhaust gas flowing into the selective reduction type catalyst 26 (=Gex−Glp1) by subtracting the amount of low pressure EGR gas Glp1 from the flow rate (amount) of the exhaust gas Gex. The ECU 20 calculates the amount anhscr (=Cnh3r1*Gscr) of the ammonia ($NH_3$) supplied to the selective reduction type catalyst 26 by multiplying the amount Gscr of the exhaust gas flowing into the selective reduction type catalyst 26 and the concentration Cnh3r1 of ammonia ($NH_3$).

When the amount anhscr of the ammonia ($NH_3$) supplied to the selective reduction type catalyst 26 is calculated according to the method as referred to above, the process of the ECU 20 goes to step S702. In step S702, the ECU 20 determines whether the difference between the amount of supply anhscr of ammonia ($NH_3$) obtained in the above-mentioned step S701 and a target value anhtrg of the amount of adsorption of ammonia is not more than a permissible value.

In cases where an affirmative determination is made in the above-mentioned step S702, the process of the ECU 20 goes to step S102, in which a predetermined amount of urea aqueous solution is caused to be supplied from the addition valve 25. On the other hand, in cases where a negative determination is made in the above-mentioned step S702, the process of the ECU 20 goes to step S703, in which the above-mentioned predetermined amount is corrected. Specifically, in cases where the above-mentioned amount of supply anhscr is less than the above-mentioned target value anhtrg, the ECU 20 corrects the above-mentioned predetermined amount in an increasing direction. On the other hand, in cases where the above-mentioned amount of supply anhscr is larger than the above-mentioned target value anhtrg, the ECU 20 corrects the above-mentioned predetermined amount in a decreasing direction.

After carrying out the above-mentioned processing of step S703, the process of the ECU 20 goes to step S102, and operates the addition valve 25 in accordance with the predetermined amount corrected in the above-mentioned step S703.

According to the embodiment described above, it is possible to carry out the acid neutralization processing, without decreasing the purification ability of the selective reduction type catalyst 26. As a result, it is possible to neutralize the acidic substances in the low pressure EGR gas passage, without increasing harmful exhaust emissions of the internal combustion engine 1.

Ninth Embodiment

Next, a ninth embodiment of the present invention will be described with reference to FIG. 15. Here, a construction different from that of the above-mentioned first embodiment will be described, and an explanation of the same construction will be omitted.

The difference of this ninth embodiment from the above-mentioned first embodiment is that the flow rate ratio of the low pressure EGR gas and the high pressure EGR gas is regulated in accordance with the amount of the ammonia ($NH_3$) flowing into the low pressure EGR passage 16 at the time when acid neutralization processing is carried out.

It can be assumed that when the flow rate of the low pressure EGR gas is small, or when the flow rate of the low pressure EGR gas is zero (only a high pressure EGR mechanism is in operation), it becomes difficult to supply an amount of ammonia ($NH_3$) corresponding to the amount of the acidic substances existing in the path of the low pressure EGR gas to the path of the low pressure EGR gas.

On the other hand, it can also be assumed that when the flow rate of the low pressure EGR gas is large, or when only the low pressure EGR gas operates (the amount of high pressure EGR gas becomes zero), the amount of supply of ammonia ($NH_3$) will become excessive with respect to the amount of the acidic substances existing in the path of the low pressure EGR gas. In particular, in the construction in which the selective reduction type catalyst 26 is arranged in a portion of the exhaust passage 6 at the downstream side of the connection portion of the low pressure EGR passage 16, when a desired amount of ammonia ($NH_3$) is to be supplied to the selective reduction type catalyst 26, there is a high possibility that the amount of the ammonia ($NH_3$) supplied to the low pressure EGR passage 16 may become excessive.

On the other hand, in the acid neutralization processing of this embodiment, when the amount of the ammonia ($NH_3$) supplied to the low pressure EGR passage 16 is insufficient, the ECU 20 serves to make an increase correction of the flow rate ratio of the low pressure EGR gas with respect to the high pressure EGR gas. In that case, the amount of the ammonia ($NH_3$) supplied to the path of the low pressure EGR gas can be made to increase, without changing the amount of EGR gas (i.e., the total amount of the amount of low pressure EGR gas and the amount of high pressure EGR gas) introduced into the internal combustion engine 1.

On the other hand, when the amount of the ammonia ($NH_3$) supplied to the low pressure EGR passage 16 is excessive, the ECU 20 serves to make a decrease correction of the flow rate ratio of the low pressure EGR gas with respect to the high pressure EGR gas. In that case, the amount of the ammonia ($NH_3$) supplied to the path of the low pressure EGR gas can be made to decrease, without changing the amount of EGR gas introduced into the internal combustion engine 1.

In the following, an execution procedure of the acid neutralization processing in this embodiment will be described refer to FIG. 15. FIG. 15 is a flow chart showing a subroutine which the ECU 20 carries out during or before the execution of the acid neutralization processing.

Figure 15:
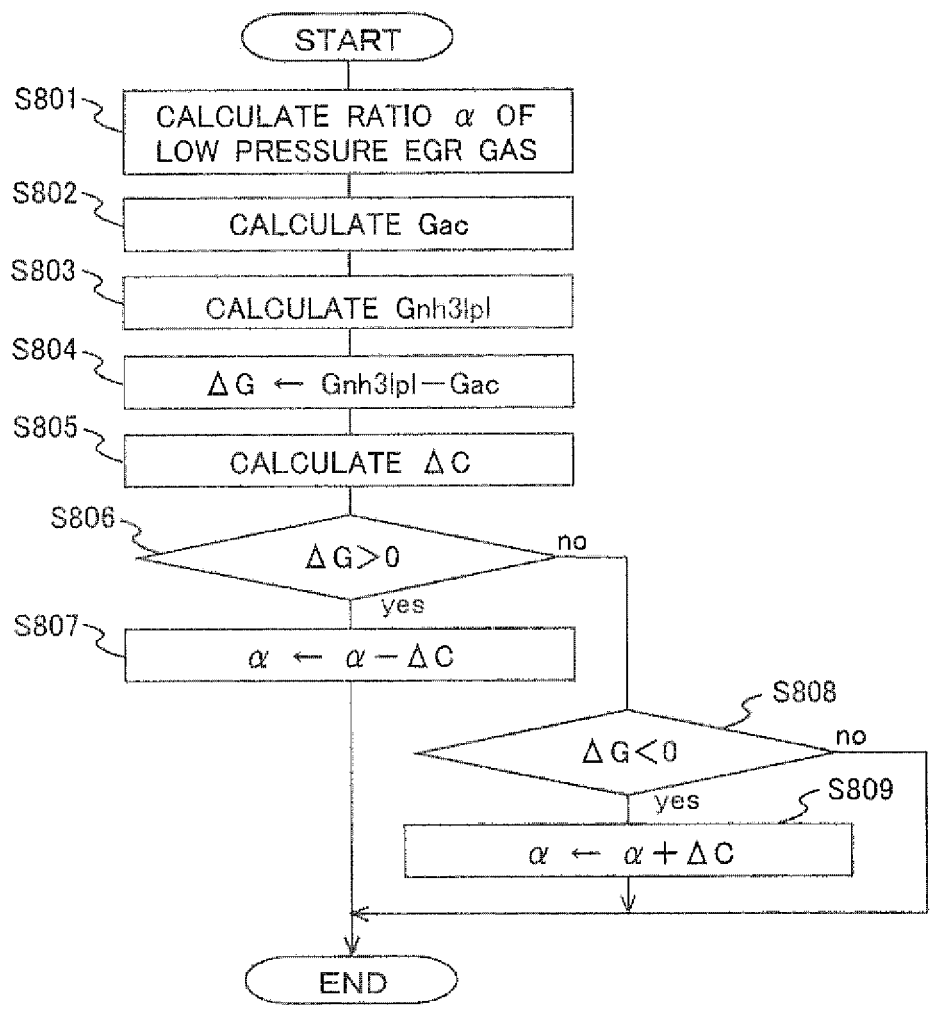
FIG. 15 is a flow chart showing a subroutine which is executed by an ECU during or before acid neutralization processing is carried out in the ninth embodiment of the present invention.

In the subroutine of FIG. 15, first in step S801, the ECU 20 calculates a ratio $\alpha$ (=(the amount of low pressure EGR gas)/(the total amount of EGR gas)) of the amount of low pressure EGR gas with respect to the total amount of EGR gas (the total sum of the amount of high pressure EGR gas and the amount of low pressure EGR gas).

In step S802, the ECU 20 calculates the amount Gac of the acidic substances existing in the path of the low pressure EGR gas. The amount Gac of acidic substances can be obtained according to the same method as in the above-mentioned fourth embodiment.

In step S803, the ECU 20 calculates an amount Ghn31p1 of the ammonia ($NH_3$) flowing into the low pressure EGR passage 16 based on the ratio $\alpha$ thus calculated in the above-mentioned step S801. Here, note that in cases where the subroutine of FIG. 15 is carried out before the execution of the acid neutralization processing, the ECU 20 carries out the above-mentioned calculation on the assumption that a predetermined amount of urea aqueous solution has been added from the addition valve 25.

In step S804, the ECU 20 calculates a difference $\Delta G$ (=Ghn31p1−Gac) between the amount Gac of the acidic substances calculated in the above-mentioned step S802 and the amount Ghn31p1 of the ammonia ($NH_3$) calculated in the above-mentioned step S803.

In step S805, the ECU 20 calculates an amount of correction $\Delta C$ for correcting the ratio $\alpha$ of the amount of low pressure EGR gas with respect to the total amount of EGR gas. The amount of correction $\Delta C$ may be a fixed amount which has been beforehand set, or may be a variable amount which is set to be a larger value when an absolute value of the difference $\Delta G$ calculated in the above-mentioned step S804 is large, in comparison with the time when it is small.

In step S806, the ECU 20 determines whether the difference $\Delta G$ calculated in the above-mentioned step S804 is larger than zero. In cases where an affirmative determination is made in step S806 ($\Delta G>0$), the ECU 20 goes to step S807. In step S807, when the ECU 20 makes a decrease correction of the ratio $\alpha$ of the amount of low pressure EGR gas with respect to the total amount of EGR gas by subtracting the above-mentioned amount of correction $\Delta C$ from the ratio $\alpha$ obtained in the above-mentioned step S801. In that case, the amount of high pressure EGR gas is increased, and at the same time, the amount of low pressure EGR gas is decreased. As a result, the amount of the ammonia ($NH_3$) supplied to the low pressure EGR passage 16 decreases, without the total amount of EGR gas being changed.

On the other hand, in cases where a negative determination is made in the above-mentioned step S806 ($\Delta G \leq 0$), the process of the ECU 20 goes to step S808, in which it is determined whether the above-mentioned difference $\Delta G$ is smaller than zero. In cases where an affirmative determination is made in step S808 ($\Delta G<0$), the ECU 20 goes to step S809. In step S809, when the ECU 20 makes an increase correction of the ratio $\alpha$ of the amount of low pressure EGR gas with respect to the total amount of EGR gas by adding the above-mentioned amount of correction $\Delta C$ to the ratio $\alpha$ obtained in the above-mentioned step S801. In that case, the amount of high pressure EGR gas is decreased, and at the same time, the amount of low pressure EGR gas is increased. As a result, the amount of the ammonia ($NH_3$) supplied to the low pressure EGR passage 16 increases, without the total amount of EGR gas being changed.

Here, note that in cases where a negative determination is made in the above-mentioned step S808 ($\Delta G=0$), the ECU 20 once terminates the execution of this routine.

According to the embodiment described above, even in cases where a low pressure EGR mechanism is in a non-operating state (i.e., in cases where the low pressure EGR valve 17 is in a valve closed state), or in cases where the flow rate ratio of the amount of low pressure EGR gas with respect to the amount of high pressure EGR gas is low, it becomes possible to neutralize the acidic substances in the path of the low pressure EGR gas.

However, it can be assumed that when the ratio $\alpha$ of the amount of low pressure EGR gas is increased in an operation region where only the high pressure EGR mechanism operates, or in an operation region where both of the high pressure EGR mechanism and the low pressure EGR mechanism operate, a misfire will occur due to a drop in the temperature at a compression end.

Accordingly, on the condition that the temperature of the gas introduced into each of the combustion chambers of the internal combustion engine 1 is higher than a lower limit value thereof, the ratio $\alpha$ of the amount of low pressure EGR gas may be corrected in an increasing direction. In that case, the ECU 20 should just correct the ratio $\alpha$ of the amount of low pressure EGR gas according to a subroutine as shown in FIG. 16.

Figure 16:
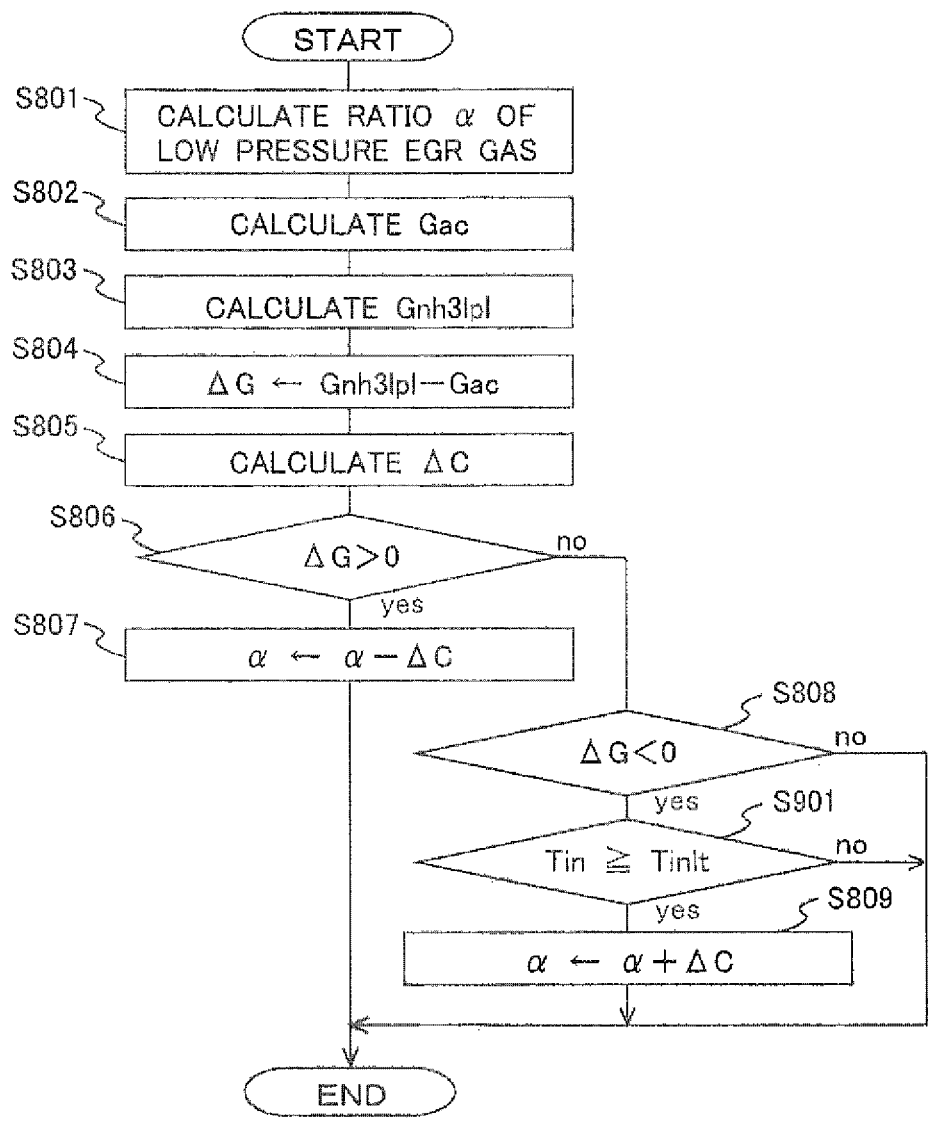
FIG. 16 is a first view showing another example of the subroutine in the ninth embodiment of the present invention.

The difference of the subroutine in FIG. 16 from the subroutine in FIG. 15 is that in cases where an affirmative determination is made in S808 ($\Delta G<0$), the processing of step S901 is carried out. In step S901, the ECU 20 determines whether the temperature Tin of the gas introduced into each of the combustion chambers of the internal combustion engine 1 is not less than a lower limit temperature Tinlt.

Here, as the temperature Tin of the gas introduced into the combustion chamber of the internal combustion engine 1, there can be used the temperature of the gas in a portion of the intake passage 4 at the downstream side of the connection portion of the high pressure EGR passage 12 (e.g., the temperature in the intake manifold 5). The temperature in the intake manifold 5 may be measured by a temperature sensor. In addition, the temperature in the intake manifold 5 may be obtained by making use of a map or a computational model which uses, as arguments, the amount of intake air, the temperature of intake air, the amount of the high pressure EGR gas, the temperature of the high pressure EGR gas, the amount of the low pressure EGR gas, the temperature of the low pressure EGR gas, and so on.

The above-mentioned lower limit temperature Tinlt is the lowest temperature of a temperature range in which a misfire can not occur, or a temperature which is a little higher than the above-mentioned lowest temperature, and it has been beforehand set by adaptation or calibration work making use of experiments, etc.

In cases where an affirmative determination is made in the above-mentioned step S901 (Tin≥Tinlt), the ECU 20 goes to step S809, in which an increase correction of the ratio α of the amount of low pressure EGR gas is carried out. However, in cases where a negative determination is made in the above-mentioned step S901 (Tin<Tinlt), the execution of this routine is ended, without the ratio α of the amount of low pressure EGR gas being corrected.

According to the subroutine as shown in FIG. 16, only in cases where the occurrence of a misfire can be avoided, the ratio α of the amount of low pressure EGR gas will be corrected in an increasing direction. As a result, it is possible to avoid reduction in drivability of the internal combustion engine 1 resulting from the execution of the acid neutralization processing.

Here, note that in cases where a negative determination is made in the above-mentioned step S901 (Tin<Tinlt), the increase correction of the ratio α may be carried out, while performing control in such a manner that the low pressure EGR gas flows so as to bypass the low pressure EGR cooler 18, or the high pressure EGR gas flows so as to bypass the high pressure EGR cooler 14. In addition, the increase correction of the ratio α may be carried out, while causing the temperatures of the low pressure EGR gas and the high pressure EGR gas to rise by adjusting the timing of fuel injection.

On the other hand, it can be assumed that in the operation region where only the low pressure EGR mechanism operates, or in the operation region where both of the high pressure EGR mechanism and the low pressure EGR mechanism operate, when the ratio α of the amount of low pressure EGR gas is decreased (i.e., the amount of high pressure EGR gas is increased), the component parts (e.g., the high pressure EGR valve 13, etc.) inside the path of the high pressure EGR gas will be overheated, or preignition of fuel will occur due to a rise in the temperature at the compression end.

Accordingly, on the condition that the temperature of the high pressure EGR gas is lower than an upper limit value thereof, the ratio α of the amount of low pressure EGR gas may be corrected in a decreasing direction. In that case, the ECU 20 should just correct the ratio α of the amount of low pressure EGR gas according to a subroutine as shown in FIG. 17.

Figure 17:
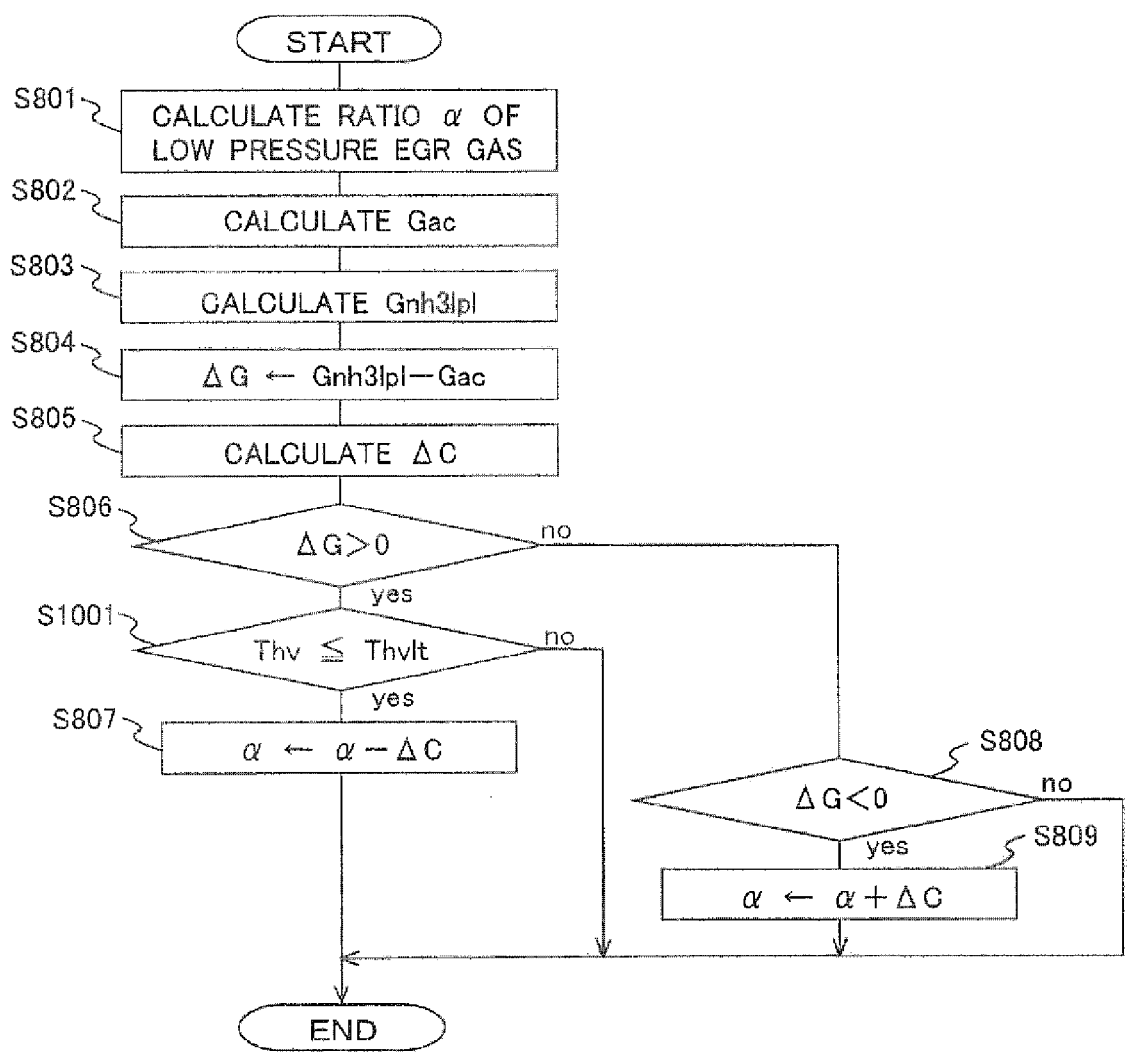
FIG. 17 is a second view showing another example of the subroutine in the ninth embodiment of the present invention.

The difference of the subroutine in FIG. 17 from the subroutine in FIG. 15 is that in cases where an affirmative determination is made in S806 (ΔG>0), the processing of step S1001 is carried out. In step S1001, the ECU 20 determines whether the temperature Thv of the high pressure EGR gas is not more than an upper limit temperature Thvlt.

Here, as the temperature Thv of the high pressure EGR gas, there can be used the temperature of the high pressure EGR gas in the vicinity of the high pressure EGR valve 13. The temperature of the high pressure EGR gas in the vicinity of the high pressure EGR valve 13 may be measured by a temperature sensor, or may be calculated from an operating state of the internal combustion engine 1 (the number of engine revolutions per unit time, the amount of fuel injection, or the like).

The above-mentioned upper limit temperature Thvlt is the lower of either the highest temperature of a temperature range in which the high pressure EGR valve 13 or the like does not overheat, or the highest temperature of a temperature range in which preignition of fuel can be avoided, or is a temperature which is a little lower than that temperature. The upper limit temperature Thvlt has been beforehand set by adaptation or calibration work making use of experiments, etc.

In cases where an affirmative determination is made in the above-mentioned step S1001 (Thv≤Thvlt), the ECU 20 goes to step S807, in which a decrease correction of the ratio α of the amount of low pressure EGR gas is carried out. However, in cases where a negative determination is made in the above-mentioned step S1001 (Thv>Thvlt), the execution of this routine is ended, without the ratio α of the amount of low pressure EGR gas being corrected.

According to the subroutine as shown in FIG. 17, only in cases where overheating of those component parts which are arranged in the path of the high pressure EGR gas, or preignition of fuel can be avoided, the ratio α of the amount of low pressure EGR gas will be corrected in a decreasing direction. As a result, it is possible to avoid deterioration in the component parts and reduction in drivability of the internal combustion engine 1 resulting from the execution of the acid neutralization processing.

Here, note that in cases where a negative determination is made in the above-mentioned step S1001 (Thv>Thclt), the decrease correction of the ratio α may be carried out, while increasing the amount of the low pressure EGR gas flowing by way of the low pressure EGR cooler 18, or increasing the amount of the high pressure EGR gas flowing by way of the high pressure EGR cooler 14. In addition, the decrease correction of the ratio α may be carried out, while causing the temperatures of the low pressure EGR gas and the high pressure EGR gas to drop by adjusting the timing of fuel injection.

Here, note that in the above-mentioned first, second, and fourth through eighth embodiments, reference has been made to examples in which the present invention is applied to an internal combustion engine having a low pressure EGR mechanism and a high pressure EGR mechanism, but it is also possible to apply the present invention to an internal combustion engine which is not provided with a high pressure EGR mechanism.

DESCRIPTION OF THE REFERENCE NUMERALS AND SYMBOLS 1 internal combustion engine
2 cylinder(s)
3 fuel injection valve
4 intake passage
5 intake manifold
6 exhaust passage
7 exhaust manifold
8 turbocharger
8a compressor
8b turbine
9 first throttle valve 11 high pressure EGR device
12 high pressure EGR passage
13 high pressure EGR valve
14 high pressure EGR cooler
15 low pressure EGR device
16 low pressure EGR passage
17 low pressure EGR valve
18 low pressure EGR cooler
19 second throttle valve
21 crank position sensor
22 accelerator position sensor
23 oxidation catalyst
24 particulate filter
25 addition valve
26 selective reduction type catalyst
27 exhaust throttle valve
28 exhaust gas temperature sensor
29 dispersion plate
30 hydrolysis catalyst
40 intercooler
260 heater

The invention claimed is:

1. An exhaust gas purification system for an internal combustion engine comprising:
   a low pressure EGR mechanism that is equipped with a low pressure EGR passage which serves to introduce a part of an exhaust gas flowing through a portion of the exhaust passage downstream of a turbine of a centrifugal supercharger to a portion of an intake passage upstream of a compressor as a low pressure EGR gas, and a low pressure EGR valve which serves to change a channel cross section of said low pressure EGR passage;
   a selective reduction type catalyst that is arranged in-a portion of the exhaust passage downstream of a connection portion of said low pressure EGR passage;
   a supply device which serves to supply an ammonia derived compound to said selective reduction type catalyst, and is arranged in such a manner that the ammonia derived compound is able to be supplied into the exhaust passage at a location upstream of the connection portion of said low pressure EGR passage; and
   a control unit that:
causes said supply device to supply the ammonia derived compound therefrom when said low pressure EGR valve is in a valve open state, makes the amount of the ammonia derived compound supplied from said supply device larger in cases where an amount of the low pressure EGR gas flowing through said low pressure EGR passage is large, in comparison with the case where it is small.

2. The exhaust gas purification system for an internal combustion engine according to claim 1, further comprising:
   an obtaining unit for obtaining a value which is correlated with an amount of acidic substances existing in a path of the low pressure EGR gas;
   wherein said control unit makes the amount of the ammonia derived compound supplied from said supply device larger in cases where the value obtained by said obtaining unit is large, in comparison with the case where it is small.

3. The exhaust gas purification system for an internal combustion engine according to claim 1, further comprising:
   a detection unit for detecting the temperature of the low pressure EGR gas;
   wherein said control unit makes an amount of the ammonia derived compound supplied from said supply device larger in cases where the temperature detected by said detection unit is higher than a predetermined reference temperature, in comparison with the case where the detected temperature is lower than the predetermined reference temperature.

4. The exhaust gas purification system for an internal combustion engine according to claim 1, further comprising:
   a heating unit for heating the low pressure EGR gas;
   wherein said control unit operates said heating unit when the ammonia derived compound is caused to be supplied from said supply device.

5. The exhaust gas purification system for an internal combustion engine according to claim 4, wherein
   said heating unit heats the exhaust gas before flowing into said selective reduction type catalyst.

6. The exhaust gas purification system for an internal combustion engine according to claim 1, further comprising:
   a dispersion plate that is arranged in a portion of the exhaust passage at the downstream side of the connection portion of said low pressure EGR passage and at the upstream side of said selective reduction type catalyst, and disperses the ammonia derived compound supplied from said supply device.

7. The exhaust gas purification system for an internal combustion engine according to claim 1, further comprising:
   a high pressure EGR mechanism that is equipped with a high pressure EGR passage which serves to introduce a part of the exhaust gas flowing through a portion of the exhaust passage at an upstream side of the turbine of said centrifugal supercharger to a portion of the intake passage at the downstream side of the compressor as a high pressure EGR gas, and a high pressure EGR valve which serves to change a channel cross section of said high pressure EGR passage; and a calculation unit for calculating an amount of the ammonia derived compound flowing through said low pressure EGR passage;
   wherein said control unit corrects a ratio between a flow rate of the low pressure EGR gas and a flow rate of the high pressure EGR gas according to a result of the calculation of said calculation unit.

8. The exhaust gas purification system for an internal combustion engine according to claim 7, wherein
   in cases where the result of the calculation of said calculation unit is less than a target amount, said control unit corrects the degree of opening of said low pressure EGR valve to an open side, and at the same time corrects the degree of opening of said high pressure EGR valve to a closed side.

9. The exhaust gas purification system for an internal combustion engine according to claim 7, wherein
   in cases where the result of the calculation of said calculation unit is larger than a target amount, said control unit corrects the degree of opening of said low pressure EGR valve to a closed side, and at the same time corrects the degree of opening of said high pressure EGR valve to an open side.

10. The exhaust gas purification system for an internal combustion engine according to claim 1, wherein
    said control unit carries out supply processing which is processing to cause said low pressure EGR valve to open so that the ammonia derived compound is made to be supplied from said supply device, when deceleration fuel cut-off control of the internal combustion engine is carried out.

11. The exhaust gas purification system for an internal combustion engine according to claim 10, further comprising:
    an exhaust throttle valve that is arranged in a portion of the exhaust passage at the downstream side of the connection portion of said low pressure EGR passage and at the downstream side of said selective reduction type catalyst and changes a channel cross section of the exhaust passage;

wherein said control unit causes said exhaust gas throttle valve to close at the time of carrying out said supply processing.

12. The exhaust gas purification system for an internal combustion engine according to claim 10, wherein said control unit makes an amount of low pressure EGR gas to be introduced into the intake passage for a predetermined period of time after termination of the deceleration fuel cut-off control smaller in cases where said supply processing has been carried out, in comparison with the case where said supply processing has not been carried out.

13. The exhaust gas purification system for an internal combustion engine according to claim 12, further comprising:

a high pressure EGR mechanism that is equipped with a high pressure EGR passage which serves to introduce a part of the exhaust gas flowing through a portion of the exhaust passage at the upstream side of the turbine of said centrifugal supercharger to a portion of the intake passage at the downstream side of the compressor as a high pressure EGR gas, and a high pressure EGR valve which serves to change a channel cross section of said high pressure EGR passage; wherein said control unit corrects the degree of opening of said high pressure EGR valve to an open side after said predetermined period of time has elapsed.

* * * * *